(12) United States Patent
Côté et al.

(10) Patent No.: US 12,045,316 B2
(45) Date of Patent: Jul. 23, 2024

(54) AUTOMATIC LABELING OF TELECOMMUNICATION NETWORK DATA TO TRAIN SUPERVISED MACHINE LEARNING

(71) Applicant: Ciena Corporation, Hanover, MD (US)

(72) Inventors: David Côté, Gatineau (CA); Thomas Triplet, Manotick (CA)

(73) Assignee: Ciena Corporation, Hanover, MD (US)

( * ) Notice: Subject to any disclaimer, the term of this patent is extended or adjusted under 35 U.S.C. 154(b) by 786 days.

(21) Appl. No.: 16/443,948

(22) Filed: Jun. 18, 2019

(65) Prior Publication Data

US 2019/0303726 A1   Oct. 3, 2019

Related U.S. Application Data

(63) Continuation-in-part of application No. 16/296,710, filed on Mar. 8, 2019, now abandoned.
(Continued)

(51) Int. Cl.
*G06N 3/04* (2023.01)
*G06F 18/21* (2023.01)
(Continued)

(52) U.S. Cl.
CPC ...... *G06F 18/2178* (2023.01); *G06F 18/2148* (2023.01); *G06N 3/04* (2013.01);
(Continued)

(58) Field of Classification Search
CPC ............ G06N 20/00; G06N 3/04; G06N 5/00; G06N 7/02
See application file for complete search history.

(56) References Cited

U.S. PATENT DOCUMENTS 9,871,582 B2   1/2018   Djukic et al.
9,924,392 B2   3/2018   Côté et al.
(Continued)

OTHER PUBLICATIONS

Ciena Corp "Alarm Correlation" YouTube [Transcript Provided by YouTube video page] [Published Nov. 2016] [Retrieved Mar. 2022] <URL: https://www.youtube.com/watch?v=8HIHqJxA4Bs> (Year: 2016).*

(Continued)

*Primary Examiner* — Luis A Sitiriche
(74) *Attorney, Agent, or Firm* — Clements Bernard Walker; Christopher L. Bernard

(57) ABSTRACT

Systems and methods include obtaining network data including first data of devices and services in the network, Performance Monitoring (PM) data associated with the devices and services and with associated timestamps, and second data including any of tickets, alarms, and events affecting some of the devices and services and with associated timestamps; obtaining one or more target events from the second data based on associated operational impact in the network; determining the PM data that is statistically correlated with the one or more target events; determining the statistically correlated PM data over a corresponding time based on the associated timestamps of the PM data and the one or more target events; and providing labels for the determined statistically correlated PM data with an associated label based on the associated target event of the one or more target events.

20 Claims, 27 Drawing Sheets

Related U.S. Application Data

(60) Provisional application No. 62/760,712, filed on Nov. 13, 2018, provisional application No. 62/640,605, filed on Mar. 9, 2018.

(51) Int. Cl.
| | |
|---|---|
| *G06F 18/214* | (2023.01) |
| *G06N 5/00* | (2023.01) |
| *G06N 7/02* | (2006.01) |
| *G06N 20/00* | (2019.01) |
| *H04L 41/5009* | (2022.01) |

(52) U.S. Cl.
CPC ............. *G06N 5/00* (2013.01); *G06N 7/02* (2013.01); *G06N 20/00* (2019.01); *H04L 41/5009* (2013.01)

(56) References Cited

U.S. PATENT DOCUMENTS

| | | |
|---|---|---|
| 2016/0212623 A1 | 7/2016 | Côté et al. |
| 2016/0330083 A1 | 11/2016 | Djukic et al. |
| 2018/0248771 A1 | 8/2018 | Côté et al. |
| 2018/0248905 A1 | 8/2018 | Côté et al. |

OTHER PUBLICATIONS

K. Zhang, J. Xu, M. R. Min, G. Jiang, K. Pelechrinis and H. Zhang, "Automated IT system failure prediction: A deep learning approach," 2016 IEEE International Conference on Big Data (Big Data), 2016, pp. 1291-1300, doi: 10.1109/BigData.2016.7840733. (Year: 2016).*
S. Jin, Z. Zhang, K. Chakrabarty and X. Gu, "Accurate anomaly detection using correlation-based time-series analysis in a core router system," 2016 IEEE International Test Conference (ITC), 2016, pp. 1-10, doi: 10.1109/TEST.2016.7805836. (Year: 2016).*
P. Casas, J. Vanerio and K. Fukuda, "GML learning, a generic machine learning model for network measurements analysis," 2017 13th International Conference on Network and Service Management (CNSM), 2017, pp. 1-9, doi: 10.23919/CNSM.2017.8255998. (Year: 2017).*
Taeshik Shon, Jongsub Moon, A hybrid machine learning approach to network anomaly detection, Information Sciences, vol. 177, Issue 18, 2007 pp. 3799-3821, ISSN 0020-0255 https://doi.org/10.1016/j.ins.2007.03.025 (Year: 2007).*
Unnamed "Supervised Learning" IBM Cloud Education [Published 2020] [Retrieved 2022] <URL: https://www.ibm.com/cloud/learn/supervised-learning#:~:text=Supervised%20learning%2C%20also%20known%20as,data%20or%20predict%20outcomes%20accurately> (Year: 2020).*
Wilson, Aidan "A Brief Introduction to Supervised Learning" Towards Data Science [Published 2019] [Retrieved 2022] <URL: https://towardsdatascience.com/a-brief-introduction-to-supervised-learning-54a3e3932590> (Year: 2019).*
Saleema Amershi,2011. CueT: human-guided fast and accurate network alarm triage. (CHI '11). Association for Computing Machinery, New York, NY, USA, 157-166. https://doi.org/10.1145/1978942.1978966 (Year: 2011).*
Liu, Dapeng et al. "Opprentice: Towards Practical and Automatic Anomaly Detection Through Machine Learning" (IMC '15). Association for Computing Machinery, New York, NY, USA, 211-224. https://doi.org/10.1145/2815675.2815679 (Year: 2015).*
Beaver, Justin & Steed, Chad & Patton, Robert & Cui, Xiaohui & Schultz, Matthew. (2011). Visualization Techniques for Computer Network Defense. 10.1117/12.883487. (Year: 2011).*
Naphade, M. R., Lin, C. Y., Smith, J. R., Tseng, B. L., & Basu, S. (Dec. 2001). Learning to annotate video databases. In Storage and Retrieval for Media Databases 2002 (vol. 4676, pp. 264-275). SPIE. (Year: 2002).*

\* cited by examiner

AUTOMATIC LABELING OF TELECOMMUNICATION NETWORK DATA TO TRAIN SUPERVISED MACHINE LEARNING

CROSS-REFERENCE TO RELATED APPLICATION(S)

The present patent/application claims priority to U.S. Provisional Patent Application No. 62/760,712, filed Nov. 13, 2018, and entitled "Systems and methods for labeling network data in support of machine learning applications," the contents of which are incorporated by reference.

The present patent/application is a continuation-in-part of U.S. patent application Ser. No. 16/296,710, filed Mar. 8, 2019, and entitled "Machine learning systems and methods to predict abnormal behavior in networks and network data labeling," which claims priority to U.S. Provisional Patent Application No. 62/640,605, filed Mar. 9, 2018, the contents of each is incorporated by reference.

FIELD OF THE DISCLOSURE

The present disclosure generally relates to machine learning systems and methods related to networking. More particularly, the present disclosure relates to machine learning systems and methods for automatic labeling of telecommunication network data to train supervised machine learning.

BACKGROUND OF THE DISCLOSURE

The ability of Artificial Intelligence (AI) systems to acquire their own knowledge by extracting patterns from raw data is known as Machine Learning (ML). Rooted in classical linear algebra and probability theory, this technology has been proven to work for a growing number of tasks, ranging from image recognition to natural language processing and others. ML is particularly powerful in the presence of massive amounts of data (a.k.a. "Big Data"). Increasingly large datasets enable increasingly accurate learning during the training of ML. At the same time, increasingly large datasets can no longer be grasped by eye, by humans, but can be scanned by computers running ML-driven algorithms. It would be advantageous to apply ML techniques to communications networks. Optical networks typically contain thousands of network elements (NE's). This number gets much larger for packet, Internet Protocol (IP), mobile, and/or "Internet of Things" (IoT) networks. All these network elements produce large amounts of data that could be consumed by ML. Furthermore, multi-layer multi-vendor telecommunications networks rapidly get very complex.

Conventionally, problem detection (i.e., anomaly detection) in networks is implemented after a failure has occurred. Specifically, following a failure or the like, an operator or technician would log into the system, perform a manual investigation, and remediation. Of course, this approach is reactive and typically involves a traffic hit, traffic loss, protection switching, etc. followed by network maintenance. Another approach to anomaly detection is to re-implement the failure scenario via a piece of software that can run and analyze the scenario in an offline manner. For a handful of Performance Monitoring (PM) metrics relating to the problem, alarms would be raised if any given PM crosses some pre-defined threshold. This is typically achieved using a rule-based engine with hard-coded if . . . else . . . statements specified by a human expert. Disadvantageously, with these conventional approaches, the reaction time is slow, engineering time is expensive, and experts are rare. Further, these approaches do not scale with large and complex networks. Also, these conventional approaches require a lot of expertise, work, and time to implement. Further, defining and updating complex if . . . else . . . rules are complicated and time-consuming, and there is limited accuracy if limited to simple rules such as 1-dimensional thresholding.

Conventional approaches using PM metrics focus on trends from individual PM metrics, such as simple linear fits and relying on subject matter experts to interpret the values of the trends. Of course, these conventional approaches do not use all available information, result in lower accuracy, and require expertise to interpret trend values.

Also, in conventional approaches for ML, telecommunications networks accumulate raw data in log files or databases that are typically stored, but not viewed. When viewed, it is typically viewed manually. ML approaches require data for learning, training, and measuring accuracy. This raw data can be used for automated ML, but it is "unsupervised" for use in tasks such as clustering or trending. Supervised ML requires labeled data, i.e., which describes what the data shows. There are no tools or approaches available today for labeling raw data from telecommunications data. It is inefficient and tedious to enter labels. Specialized knowledge is required to know the network status and associated labels for raw data.

The first generation of machine learning focused mainly on unsupervised learning to detect trends and anomalies. After deployment in production, it was observed these aspects, while helpful, were lacking in practice. Specifically, this application misses the context related to operational impact as well as any guidance for remediation. As such, supervised learning addresses these deficiencies. Supervised learning utilizes labeled data sets to train machine learning processes. However, the difficulty with supervised learning is in obtaining labeled data sets. A simple, yet inefficient approach is to label data by hand. Of course, it would be advantageous to introduce automation into this process.

BRIEF SUMMARY OF THE DISCLOSURE

Compared to conventional approaches which rely on subject matter expertise, ML is attractive because it tends to produce highly reusable and highly automatable software, it is often easier to implement, and it can yield better performance. However, subject matter expertise remains required to prepare the input data and interpret the output insights of concrete ML applications.

Machine Learning systems and methods to predict events in a telecommunications network include, responsive to obtaining Performance Monitoring (PM) data over time from the telecommunications network, reducing the PM data for each time bin to a single number representing a probability of being normal (a "p-value") to transform an n-dimensional time-series, n being a number of different types of PM data, into a 1-dimensional distribution; utilizing one or more forecast models to match the 1-dimensional distribution and to extrapolate the 1-dimensional distribution towards future time; and determining abnormal behavior in the telecommunications network based on the extrapolation and causing a remedial action based thereon.

In an embodiment, a system includes a processor; and memory storing instructions that, when executed, cause the processor to obtain network data including first data of devices and services in the network, Performance Monitoring (PM) data associated with the devices and services and with associated timestamps, and second data including any of tickets, alarms, and events affecting some of the devices and services and with associated timestamps, obtain one or more target events from the second data based on associated operational impact in the network, determine the PM data that is statistically correlated with the one or more target events, determine the statistically correlated PM data over a corresponding time based on the associated timestamps of the PM data and the one or more target events, and provide labels for the determined statistically correlated PM data with an associated label based on the associated target event of the one or more target events.

In another embodiment, a method and a non-transitory computer-readable medium includes instructions for automatically labeling data from a telecommunications network. The method and the instructions include steps of obtaining network data including first data of devices and services in the network, Performance Monitoring (PM) data associated with the devices and services and with associated timestamps, and second data including any of tickets, alarms, and events affecting some of the devices and services and with associated timestamps; obtaining one or more target events from the second data based on associated operational impact in the network; determining the PM data that is statistically correlated with the one or more target events; determining the statistically correlated PM data over a corresponding time based on the associated timestamps of the PM data and the one or more target events; and providing labels for the determined statistically correlated PM data with an associated label based on the associated target event of the one or more target events.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1A:
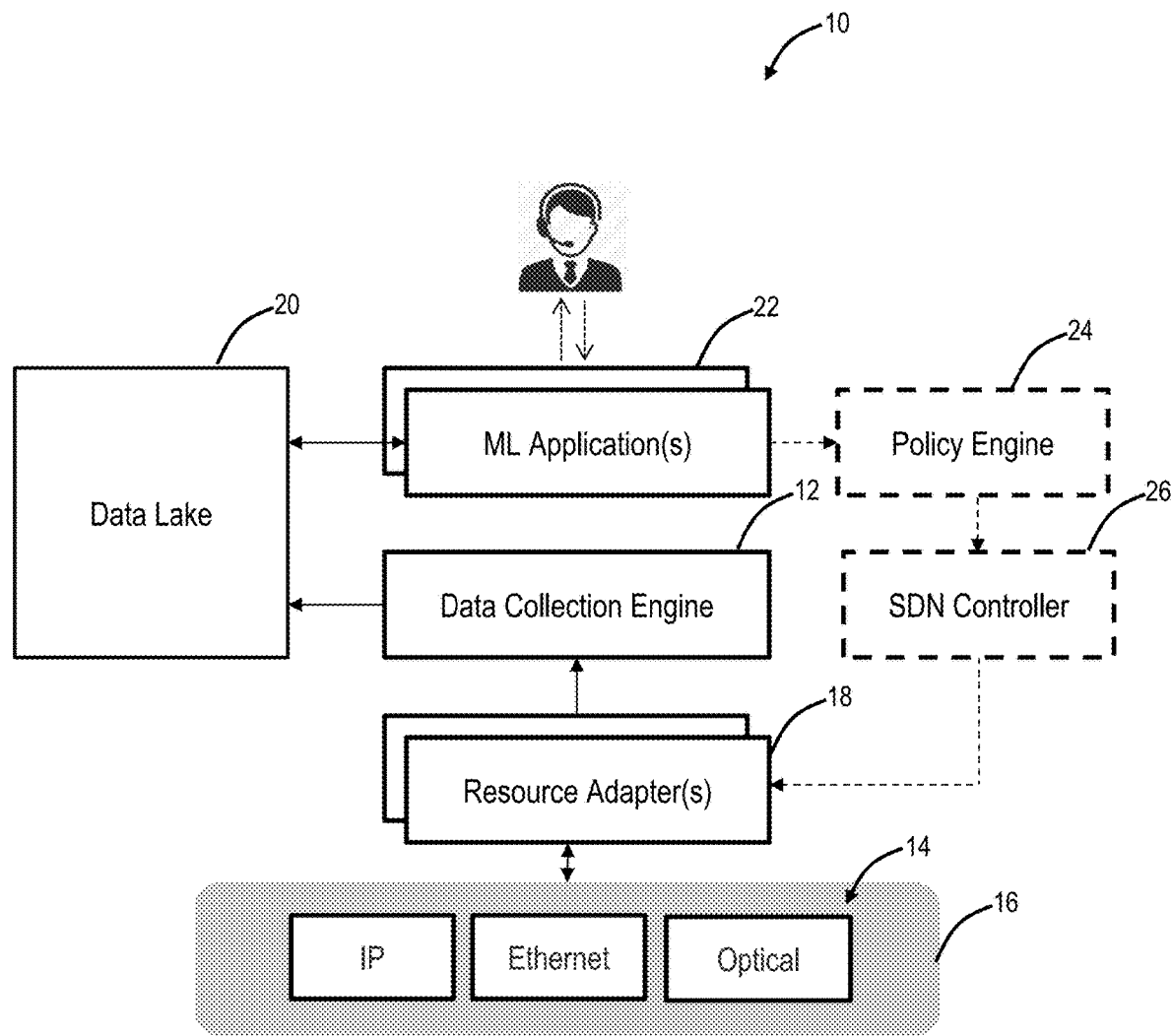
FIG. 1A is a block diagram of a Machine Learning (ML) system.

The present disclosure relates to machine learning systems and methods to predict abnormal behavior in networks including labeling network data in support of the machine learning applications. The systems and methods provide an efficient and user-friendly interface for human-experts to input labels that automatically get associated with telecommunications equipment or services and related telemetry data. For example, this can be performed through a Graphical User Interface (GUI) such as through a Web page or application, or done programmatically via Application Programming Interfaces (APIs) (e.g., Representational state transfer (REST) or others). The systems and methods further provide a technique to automatically label data based on determining which Performance Monitoring (PM) data is statistically correlated with a specified event.

Active learning software can proactively request inputs from users for cases where ML inference is not conclusive (and would benefit from additional "supervised" training), but not otherwise. The systems and methods can guide human-experts to provide the most benefits with the least effort. The systems and methods include an architecture to store and read back the label information, such that labels can be efficiently re-used for multiple tasks. The labels characterize the true state of a data-source at a given time, in an absolute manner. (By contrast, it does not characterize the insights derived from a specific data analysis.) A data source can be a physical or virtual telecommunications device, a service or an application of the network, a connected "thing" (as in IoT), a user of the network, etc. Raw data and labels can be stored in two separate database tables, which can be joined after the fact from data-source ID and timestamp information in a Structured Query Language (SQL) query. The systems and methods provide concepts of "raw dataset" versus "labeled dataset" in the metadata catalog. The systems and methods can include programmatic APIs to consume labeled data for machine learning tasks and a GUI for humans to consume the labeled data and share this important information across multiple cross-functional teams.

The systems and methods can include a cloud architecture where multiple different telecommunications networks can provide labeled data with specific mechanics of label POST, GET, UPDATE, DELETE operations. Labels can be communicated for lists of points (data-source id, time). The GUI can collect label inputs via mouse operations, touch screen, using lasso or rectangle operations, and a popup menu with label categories, etc.

Also, the present disclosure relates to machine learning systems and methods to predict abnormal behavior in networks. The systems and methods can be implemented through a software application executed on a processing device communicatively coupled to a network. The systems and methods utilize big data and machine learning on datasets from the network with associated algorithms to develop actionable insights based thereon. The software application can be in a Networks Operations Center (NOC) or the like and can continuously operate to provide the actionable insights. In this manner, the software application can provide valuable analytics to assess current and potential future network health. The software application uses training data associated with normal network operations and once trained, the software application can operate on ongoing network data to derive either probability of anomalies (such as on a per Network Element (NE) basis) or likely problems based on classification. Specifically, the software application can operate either with supervised learning, unsupervised learning, or both. Advantageously, the machine learning described herein enables the software application to learn the thresholds on various performance monitoring metrics and what is normal/abnormal, reducing the requirement for expert involvement. The software application described herein can operate with supervised and/or unsupervised learning techniques.

In an application, the software application can be referred to as a Network Health Predictor (NHP) that can cooperatively operate with existing network management platforms to complement the existing alarm/alert systems. The NHP can proactively provide actionable insights into network activity including proactive alerts for maintenance in advance of failures or faults, smart alarming which reduces the need for subject matter experts in network management by correlating multiple alarms for root cause analysis, and the like. The systems and methods address the Predictor ("P") in the NHP, as well as predictors in other applications such as a Service Health Predictor (SHP), Application Health Predictor (AHP), and the like.

The first and most important concept for the machine learning systems and methods is the data itself. This is a source of information on which the entire machine learning stack depends. Next are the different algorithms that can be used to extract (or learn) the relevant information from the raw data, provided all the required infrastructure is in place. And last, are the applications that leverage this information to solve concrete problems and provide added-value.

Data

A variety of data sources can be exploited to get information about every component of the network, from the physical (or virtual) devices to the communication channels, the usage patterns, the environment, and the business context. Network devices (e.g., network elements) generate Performance Monitoring (PM), alarms, and/or logging data. These include things like power levels, error counters, received, transmitted or dropped packets, Central Processing Unit (CPU) utilization, geo-coordinates, threshold cross, etc. Communication channels (or "services") also generate PM data, for all layers of the Open Systems Interconnection (OSI) model (ISO/IEC standard 7498-1, 1994). For instance, layer-3 network performance is characterized by bandwidth, throughput, latency, jitter and error rate. End-users', environmental, or business data typically come from third-party databases.

Each time any of the above data is collected, it is useful to record a timestamp associated with it. Time is especially important because it can be used to correlate independent data sources. For instance, data from different sources can be associated if they were all taken during the same time interval, to define a "snapshot." Furthermore, sorting data in chronological order is frequently used to measure time-series trends to anticipate future events.

Most communication networks connect to a plurality of device types. And different types of devices from different equipment vendors tend to produce different data in different formats. Hence, communication networks are said to generate a wide variety of data. In addition, the frequency at which the above data is collected (a.k.a. velocity) can vary for each source. Likewise, the amount of time during which the data is kept in storage can also vary. When networks contain a large number of devices and services, with high-frequency data-collection and/or long storage periods, the result is large data volumes. The combined Variety, Velocity and Volume is often referred to as "Big Data."

Equipped with sufficient infrastructure, a common approach is to collect and store all available data, and enable ad-hoc analysis after the fact (i.e., in a reactive manner). When this is not possible, tradeoffs have to be made to only pick the most valuable data for the targeted application(s). For example, an optical networking effect of State of Polarization (SOP) transients was explained more accurately when using additional inputs such as weather data (D. Charlton et al., "Field measurements of SOP transients in OPGW, with time and location correlation to lightning strikes", Optics Express, Vol. 25, No. 9, May 2017). Here, the external weather data yielded a correlation between lightning strikes and SOP transients. With the systems and methods described herein, wider variety, larger velocity and larger volumes of data will broaden the coverage and increase the accuracy of ML-driven applications.

The software application of the systems and methods uses relevant Performance Monitoring (PM) data along with other data to describe the behavior of a telecommunications network. The network can include an optical layer (e.g., Dense Wavelength Division Multiplexing (DWDM), etc.), a Time Division Multiplexing (TDM) layer (e.g., Optical Transport Network (OTN), Synchronous Optical Network (SONET), Flexible Ethernet (FlexE), etc.), a packet layer (e.g., Ethernet, Multiprotocol Label Switching (MPLS), Internet Protocol (IP), etc.), and the like. Those skilled in the art will recognize actual network implementations can span multiple layers. The software application can operate at a single layer or concurrently at multiple layers. Each of these layers can include associated PM data which describes the operational status over time at the layer.

Examples of PM data include, without limitation, optical layer data, packet layer data, service and traffic layer data, alarms, hardware operating metrics, etc. The optical layer data can include pre-Forward Error Correction (FEC) Bit Error Rate (BER), post-FEC BER (estimate), number of corrected errors, chromatic dispersion, Polarization Dependent Loss (PDL), Estimated Optical Signal to Noise Ratio (OSNR), latency, TX power, RX power (total, individual channels), power loss, Q factor, fiber type and length, etc. The packet layer data can include port level information such as bandwidth, throughput, latency, jitter, error rate, RX bytes/packets, TX bytes/packets, dropped packet bytes, etc. The service and traffic layer data can be Time Division Multiplexing (TDM) Layer 1 (L1) PM data such as Optical Transport Network (OTN). The packet layer data can be associated with a device port while the service and traffic layer data can be associated with a particular L1 connection/service. The alarm data can be various types of alarms supported by a network element (e.g., chassis, MPLS, SECURITY, USER, SYSTEM, PORT, SNMP, BGP-MINOR/WARNING/MAJOR/CRITICAL, etc.). The hardware operating metrics can include temperature, memory usage, in-service time, etc.

Throughout, the term network elements (NE) can interchangeably refer to a variety of network devices, such as nodes, shelves, cards, ports, or even groups of such NEs. No matter the identity of the elements, however, the technique described herein for determining the normalcy of their behavior remains similar and remains valid as long as the relevant data for each element are accessible to the anomaly detection software application.

The systems and methods include building a single trend from multiple PM data time-series and using a single trend to predict network anomalies for proactive actions. Both these techniques can be implemented in a machine learning engine that can use arbitrary PM data from any device type, any vendor, etc.

ML System

FIG. 1A is a block diagram of a machine learning system 10. A data collection engine platform 12 collects telemetry data from devices 14 of a telecommunications network 16 (e.g., Internet Protocol (IP), Ethernet, Optical, and combinations thereof) through resource adapter(s) 18 and stores it in a "data lake" 20. ML Applications 22 such as NHP, Service Health Predictor (SHP), Application Health Predictor (AHP) or others can read back this data, analyze it and report insights to end-users or to a Policy Engine 24, a Software Defined Networking (SDN) controller 26, etc. Most notably, these applications 22 can make use of a machine learning engine. The Policy Engine 24 is an optional interface to abstract the insights reported by the applications 22 from the resulting actions on the network 16. If applicable, the Policy Engine 24, in turn, can trigger automated actions in or for the telecommunications network 16 in reaction to these incoming insights. The solid lines are required for read-only applications. The additional dashed lines are required for closed-loop automation.

Those skilled in the art recognize various problems can occur in a telecommunications network 16. At the optical layer, fibers can be moved, pinched or partially disconnected; light can be attenuated, device performance can decrease from aging, drift, etc. At the packet layer, Code Violations can be introduced, Frame Check Sequence (FCS) can burst, Ethernet Frames can be corrupted or dropped, etc. At the service layer, there can be un-availability, low throughput, high latency, high jitter, etc. At the application layer, there can be poor audio/video quality, slow response time, and so on. Each of these problems has a root cause and can have an impact on other elements of the network 16, which can all be characterized by a variety of PM metrics.

In an embodiment, the ML applications 22 can be hosted on a single computer with regular data storage and CPU. Providing there is software able to collect raw data and transform it into a consumable format by ML algorithms. This basic setup is sufficient to process small data sets in non-production environments. To use deep learning algorithms, it is generally required to accelerate computations with specialized hardware such as Graphics Processing Units (GPU's) or Tensor Processing Units (TPU's). To exploit synergies of ML with Big Data, more infrastructure is required to handle the large Variety, Volume and/or Velocity of the "Big" data. Wide variety requires an abstraction layer between the raw inputs from many sources and the ML algorithms. This abstraction layer can include resource adapters 18. Large volume requires distributed storage and parallel computing on a computer cluster. This is referred to as the "data lake" 20 or a "cloud." Furthermore, it employs a mechanism to read back and process batches of data. This is commonly achieved with software tools such as Apache Hadoop and Apache Spark. Finally, fast velocity requires data-streaming capabilities. This can be achieved by employing tools like Apache Kafka to the Hadoop/Spark cluster.

ML Techniques

To forecast the occurrence of network anomalies with improved efficiency and confidence, it is desirable to leverage as much information as possible from as many sources as possible. For example, this is done by first modeling the time-evolution of the data, then using a model to extrapolate towards the future. Assuming that the machine learning system 10 collects and prepares all the relevant data, one still needs to solve a problem: how to model the data to provide accurate forecasting?

One approach could be to model the correlated evolution of the multiple PM's over time with an analytical function derived from first principles. This type of solution requires subject matter expertise and tends to be specific to each subject, which is not ideal. Another approach includes modeling the time evolution of a single PM and only using this PM to derive forecasts. This solution is simpler and more generic may not be using all the information available, which can result in lower accuracy. It also requires a choice of the best PM appropriately, which again requires subject matter expertise.

In ML, the process of learning from data is called "training." It is useful to split ML algorithms into two broad categories: supervised learning and unsupervised learning, depending on how their training is performed.

With unsupervised ML, the training involves three components: a dataset X, a model $M(x, \theta)$, and a cost function $C(x, M(x, \theta))$. The vector x represents a "snapshot" of the system under study. For instance, x can contain PM data from a network device at a given time. Then, the dataset X would be a list of "snapshots" collected at multiple times/windows. In mathematical terms, X is vector of vectors, also known as a tensor. The model aims to represent the true probability distribution P(x). It depends on parameters $\theta$ whose values are unknown a priori but can be learned from data. The learning itself consists of finding the values $\theta^*$ that minimize a cost function for the entire dataset X.

$$M(x, \theta) \xrightarrow{training} M(x, \theta^*) \quad (1)$$

$$\theta^* = \arg\min_{x \in X} C(x, M(x, \theta)) \quad (2)$$

An example of implementing Eq. 2 is the gradient descent method. After this point, we say that the ML model has been trained. In principle, the trained model $M(x, \theta^*)$ provides the best estimate of the true P(x), given the amount of information in X. To improve further, one can add training data (i.e., extend X), such that:

$$\lim_{X \to \infty} M(x, \theta^*) \approx P(x). \quad (3)$$

Note that Eq. 2 works best if the model M is appropriate for the dataset X. If this is not the case, the accuracy of M can saturate and one should consider changing to a different model M'(x, θ').

For supervised ML, additional data—the label—provides the true nature of the system under study. This turns a raw dataset X into a labeled dataset $X_y$, where "y" represents the label(s) associated with each x. The additional label information can be leveraged in the cost function: C'(y, x, M(x, θ)). The minimization of C' can favor parameters that return the correct answer for y. In this way, in supervised ML, the machine can learn to predict labels "y" from x, such that:

$$\lim_{X \to \infty} M(x, \theta^*) \approx P(y|x). \quad (4)$$

For instance, labels can tell the true state of a network device ("normal state," "abnormal state," etc.) at the time the corresponding PM data was collected. And supervised ML can learn to identify devices in an abnormal state from their raw PM data.

A useful property of supervised ML is its ability to measure accuracy in a reliable way. For example, this can be performed by splitting the labeled dataset in (at least) two independent parts: $X_y^{train}$ and $X_y^{test}$. The model is trained using $X_y^{train}$ only, and the properties of the trained model can be benchmarked on $X_y^{test}$. By doing so, each prediction of M(x, θ*) can be compared to the "truth" provided by the labels in $X_y^{test}$. For a binary classifier, for instance, this enables the measurement of true and false positive rates, confusion matrix, etc. Furthermore, it can be safely assumed that these test results are unbiased because $X_y^{test}$ is statistically independent from $X_y^{train}$ and that $X_y^{test}$ is a representative control sample because it derives from the original sample $X_y$.

Figure 1B:
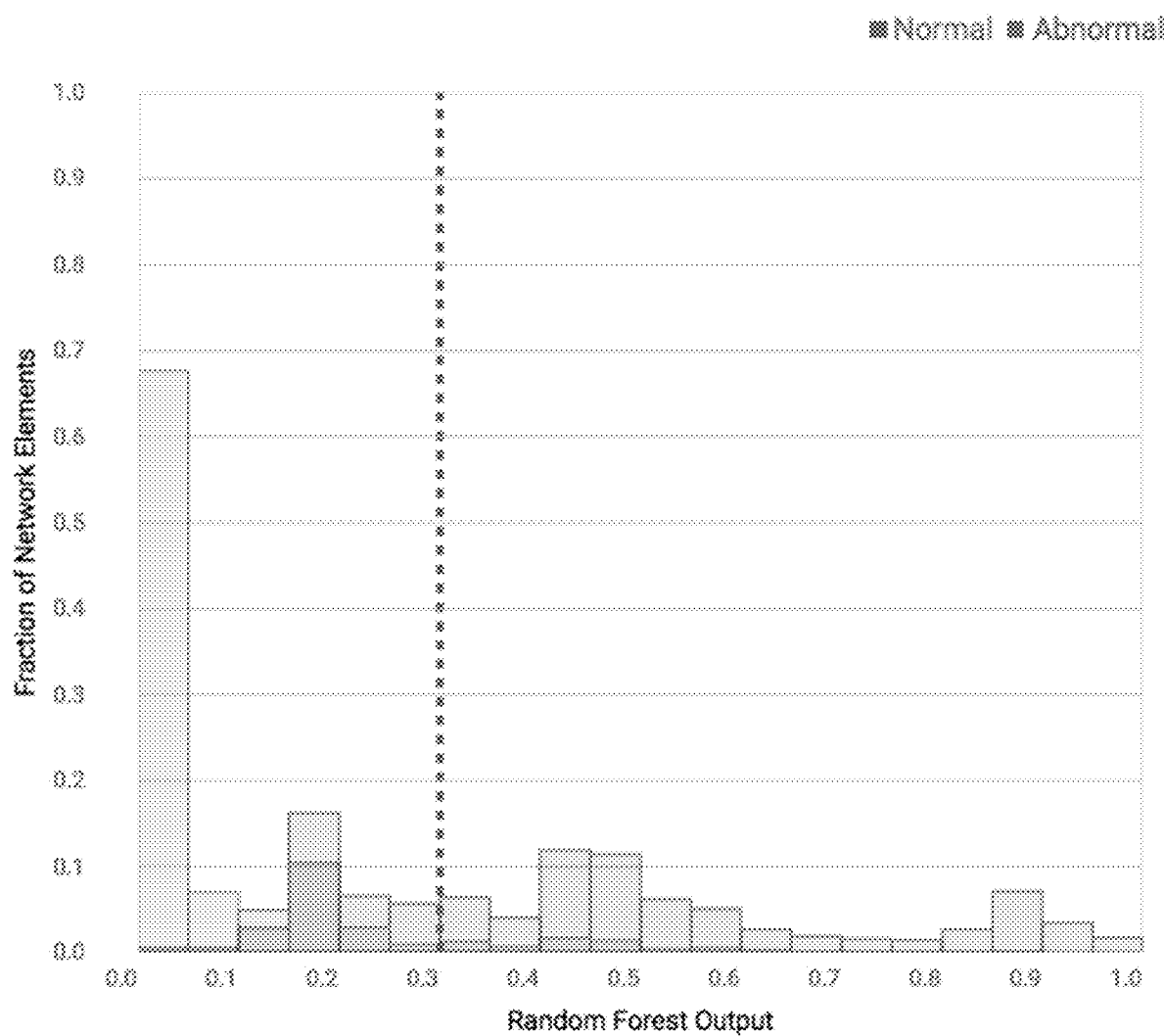
FIG. 1B is a graph of an example test distribution from a supervised ML algorithm (Random Forest Regression)
Figure 1C:
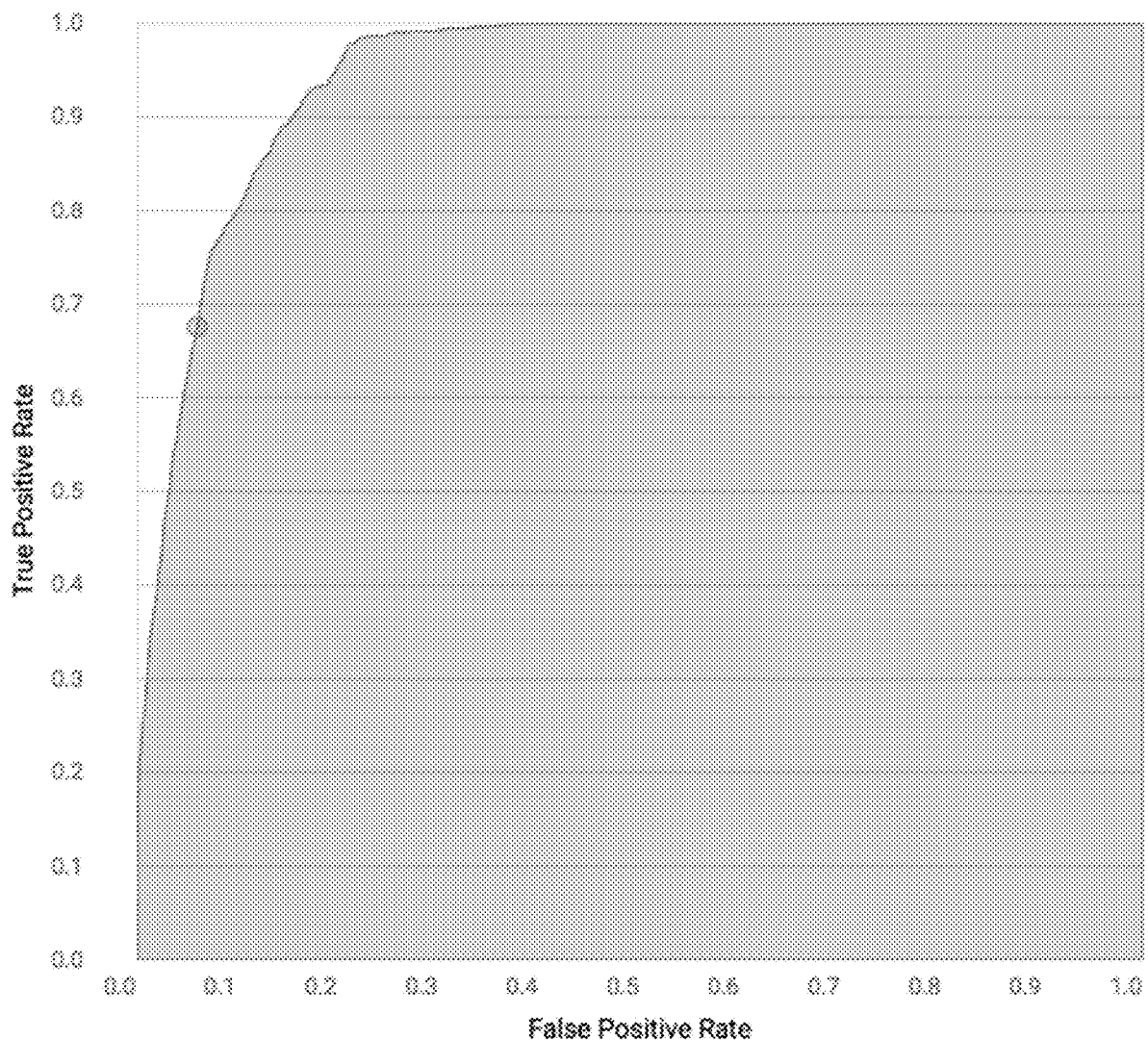
FIG. 1C is a graph of a Receiver Operating Characteristic (ROC) curve from the test results from FIG. 1B.

A concrete example of this procedure—implemented with the Network Health Predictor application—is shown on FIGS. 1B and 1C. FIG. 1B shows the output of a supervised Random Forest Regression algorithm on $X_y^{test}$, for two labels: "normal" and "abnormal." The output distribution is continuous between 0 and 1, with "normal" outputs towards zero and "abnormal" outputs towards one. This can be turned into a binary classifier with a cut-off threshold illustrated by the dashed line. In turn, the performance of the classifier can be characterized by a ROC curve illustrated in FIG. 1C. The dot on FIG. 1C corresponds to a threshold of 0.3 illustrated in FIG. 1B. Through such a process, it is possible to adjust the threshold on the supervised ML output in order to achieve a target performance point on the ROC curve. This can be handy as different use-cases can require different trade-offs between true positive efficiency and false positive noise.

One important drawback of supervised ML, however, is that labeled datasets can be difficult to obtain in practice. In particular, raw telemetry data from communication networks is usually not labeled. Hence, it is often necessary to use unsupervised algorithms in concrete networking applications. Hybrid approaches such as semi-supervised learning, multi-instance learning, or one-shot learning can also be used.

For applying ML for networking applications, tasks that can be performed as "read-only" operations on the network, namely: classification, anomaly detection and regression (trends). These can be implemented by a variety of supervised and/or unsupervised learning algorithms. Also, ML can be used to decide when and how to take actions on an "adaptive" network, in the context of closed-loop Software Defined Networking (SDN) automation. Example techniques can include ML frameworks such as: SciPy, SciKitLear, Keras (keras.io), TensorFlow, Torch, R, ROOT, and the like.

Classification of Network Events can use Supervised ML—classifiers: Artificial Neural Network (ANN) with SoftMax or Unsupervised: auto-encoders.

Detection of Network Anomalies can use Supervised—ANN, Boosted Decision Tree (BDT), Random Forest and Unsupervised ML—Likelihood.

Prediction of Future Events from Trends can use Unsupervised ML—time-series trending: regression of analytical functions, Autoregressive Integrated Moving Average (ARIMA), Long Short-Term Memory (LSTM) neural network.

Learning to Take Actions on the Network can be above ML plus a rules-based Policy Engine, and reinforcement learning can be used as a way to optimize networks.

ML Process

Figure 2:
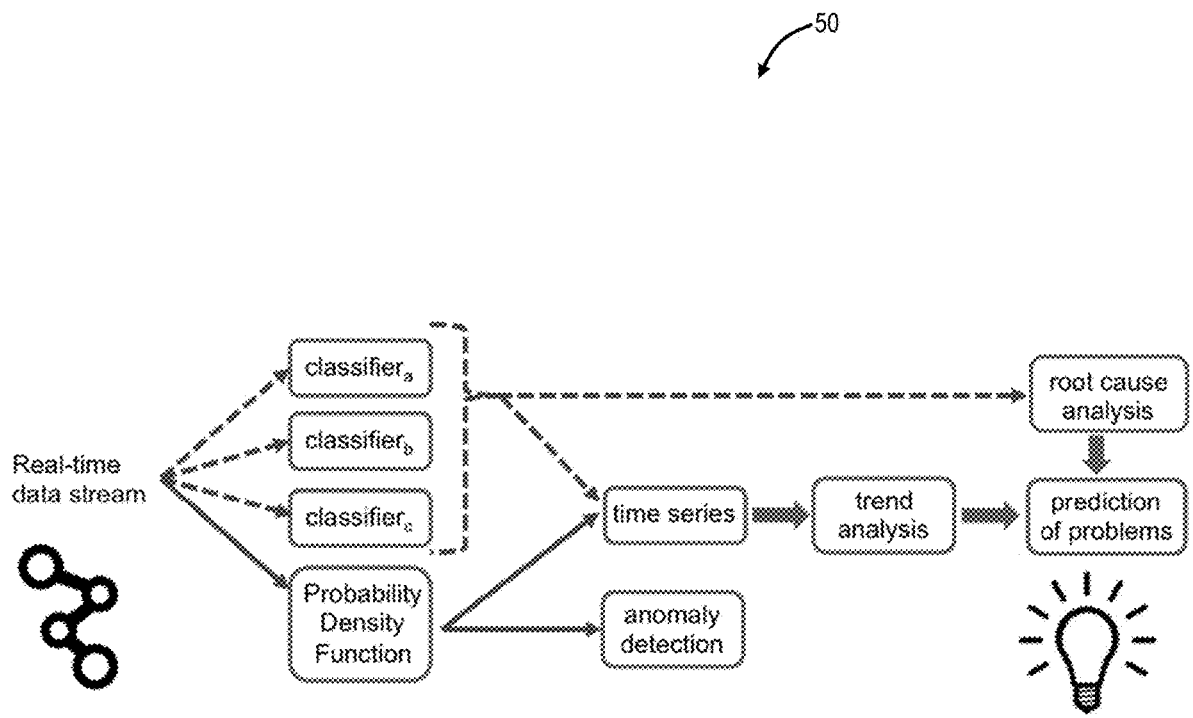
FIG. 2 is a diagram of a three-step process used by the machine learning system.
Figure 3:
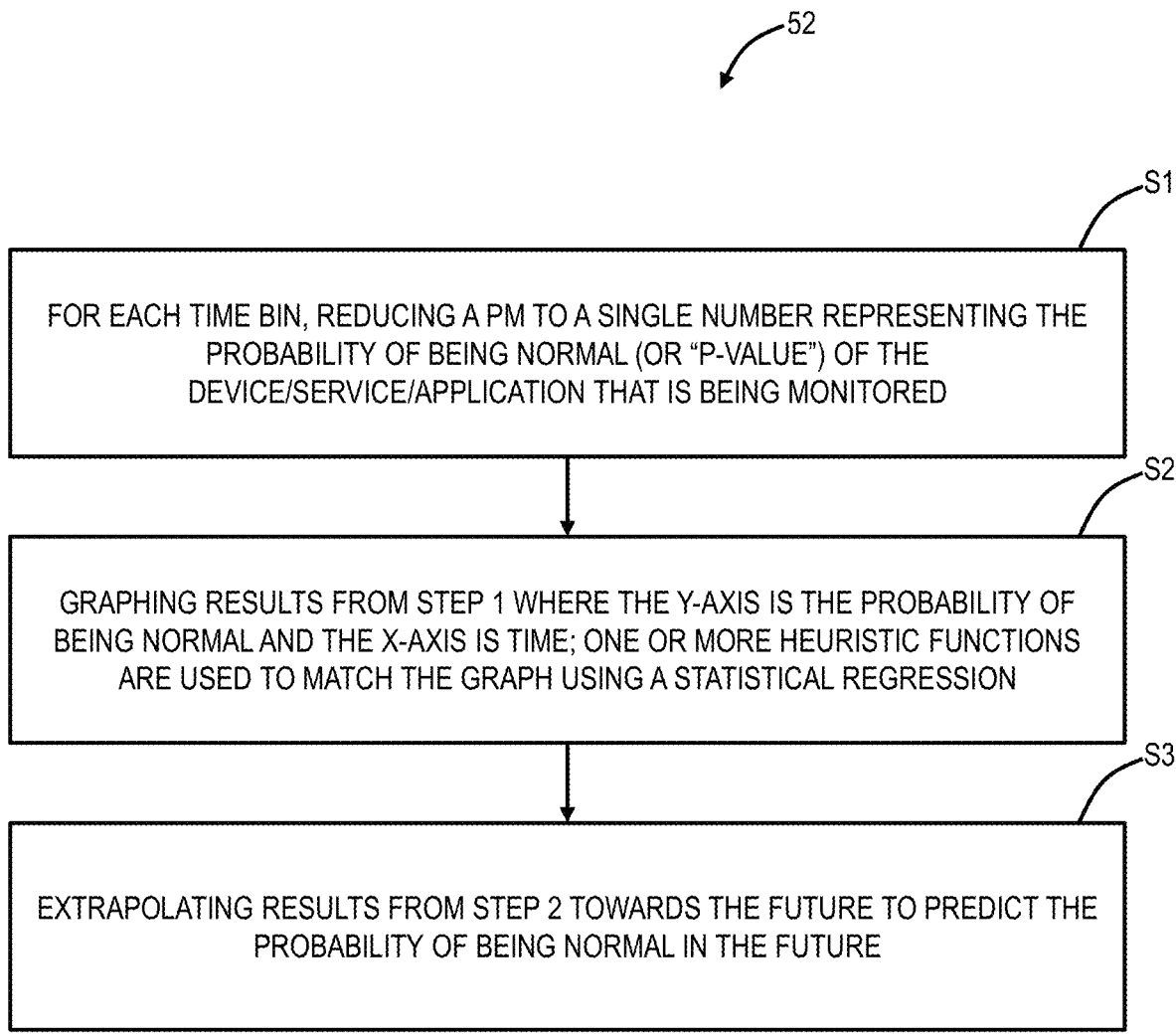
FIG. 3 is a flowchart of a forecast processing.

FIG. 2 is a diagram of a three-step process 50 used by the machine learning system 10. FIG. 3 is a flowchart of a forecast process 52. Here, there is a real-time data stream (PM data) from the telecommunications network 16, such as stored in the data lake 20 and/or analytics platform in FIG. 1.

Step S1: the process 52 includes, for each time bin, reducing a PM to a single number representing the probability of being normal (or "p-value") of the device/service/application that is being monitored. This transforms the n-dimensional time-series into a 1-dimensional distribution, which is much easier to model.

Step S2: the process 52 includes graphing results from step S1 where the y-axis is the probability of being normal and the x-axis is time. Then, one or more heuristic functions—referred to as forecast models—are adjusted to match the historical data on the graph using statistical regression.

Functions that are known to generalize well for common scenarios include: 1st or 2nd order polynomial when a device performance is degrading continuously; "piece-wise" combination of 1st or 2nd order polynomials when a device performance is first stable, and eventually starts degrading continuously; LSTM neural network or ARIMA models for scenarios in which a device performance varies with seasonal (e.g., day/night, weekdays/weekend, etc.) effects, and the like.

Figure 4:
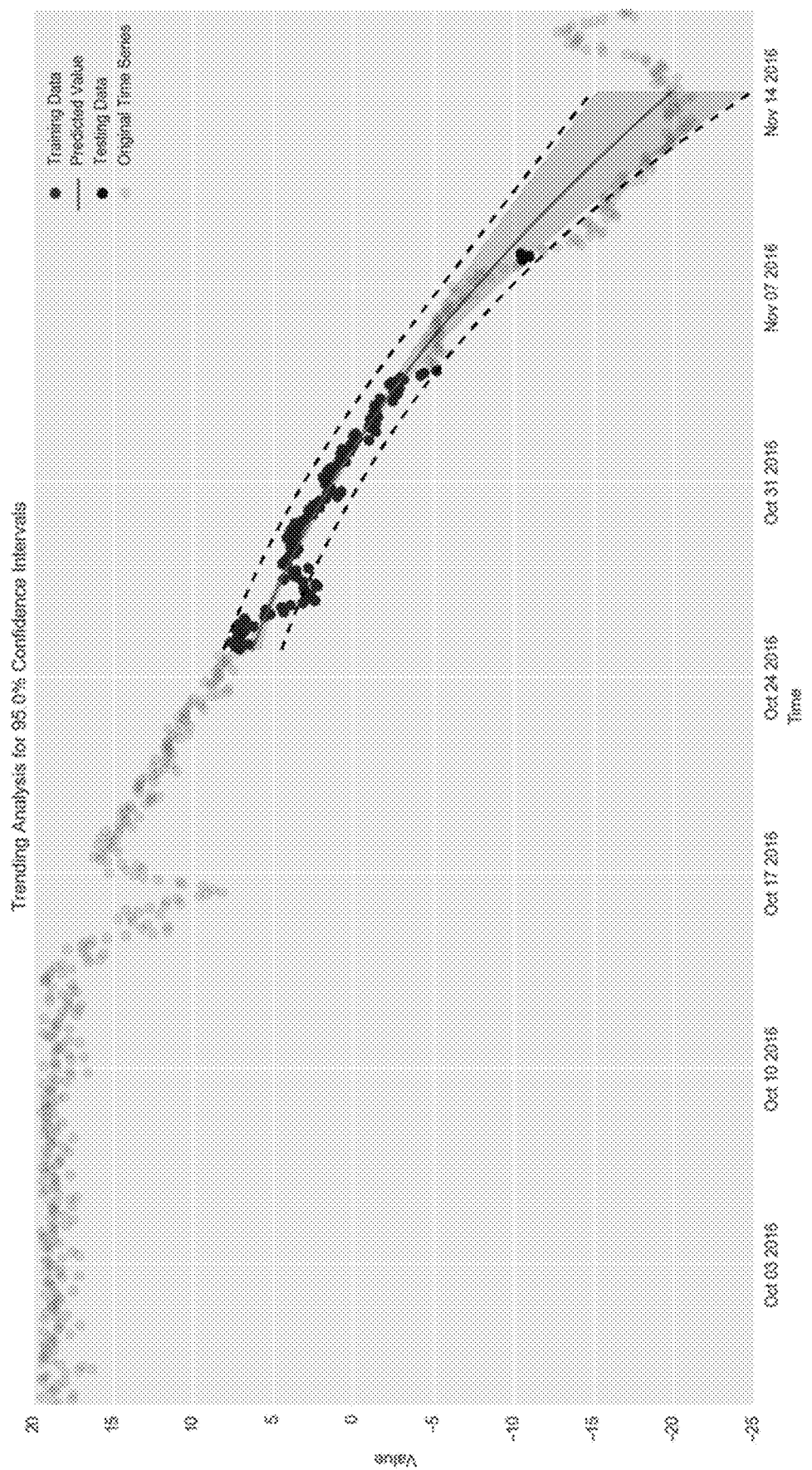
FIG. 4 is a graph of a k-fold cross-validation approach.

If several models are considered, the best one can be selected with a k-fold cross-validation approach (e.g., FIG. 4 is a graph of a k-fold cross-validation approach).

Back in FIG. 3, at Step S3: the process 52 includes extrapolating results from step S2 towards to future and predict the probability of being normal versus time. At a given time, the most probable p-value is the one obtained with the best value of each model parameter, according to Step S2. This prediction can include uncertainties. The uncertainties are estimated by varying each forecast model parameter within its 95% Confidence Interval and re-calculating the predicted p-value accordingly. Alternatively, the same process can be used to estimate the most probable time and the uncertainty interval within which a network element will reach a given p-value.

To analyze a full network 16 with the machine learning system 10 and the machine learning process, the above three steps can be performed for every network element or device 14, resulting in a forecast of the probability of being normal versus time for each element or device 14. This operation can be efficiently parallelized in a distributed computing framework like, e.g., Apache Spark. Furthermore, this analysis can be repeated periodically (every hour or every day, for instance), using a sliding-window approach, to update the forecasts with most recent inputs. The same process can apply to services with SHP or applications with AHP.

Finally, end-users can configure the NHP (or SHP or AHP) application(s) to specify a probability threshold beyond which they consider a network element (or service or application) to be in a problematic state. For instance, a network operator can be willing to tolerate a 0.1% probability of being normal, while another operator can more aggressively set a threshold at 1% probability. Note that this probabilistic approach is general, and can hence be applied to any PM's from any device from any vendor from any network technology. Then, the application(s) 22 can notify users whenever a device 14 (or service or application) is forecasted to cross their user-defined threshold. Or they can optionally leverage the policy engine for more complex rule-based implementations. Furthermore, the application 22 can communicate a time interval within which the threshold-crossing is predicted to occur, allowing the network operator (end-user) to take actions before the problem actually occurs.

In addition to the notification, the application(s) 22 can cause a remedial action in the network 14, such as, for example, replacing hardware, troubleshooting cabling, adding more bandwidth, rerouting services, switching to protection, and the like. The objective of the machine learning system 10 and machine learning process is to identify problems before outages, service disruption, etc. Thus, the remedial action is anything to further those objectives.

The systems and methods enable pre-emptive maintenance by being able to identify risky network elements or devices 14 from their trends before they actually get in a problematic state. This can be very valuable for network operators who no longer need to react to catastrophic events but can work on their network during scheduled maintenance windows. In combination with Big Data infrastructure, the application 22 can continuously monitor arbitrarily large and complex networks 16, automatically. When abnormal elements are identified, the application 22 helps operators to troubleshoot the issue and identify its root cause faster. The application 22 can also do this automatically.

The insights reported by the application 22 are reported on a Graphical User Interface. These are used to trigger remedial actions automatically. For example, this can mean to open tickets in a troubleshooting system or send messages to on-call personnel/experts. Further, this can mean to automatically re-route a service to its protection path. Even further, the remedial action can include replacement of hardware prior to failure based on the trends.

ML Applications

After the above data, processes, and infrastructure is all in place, a large number of potential ML applications 22 become enabled for the telecommunications industry. These can be categorized as: descriptive, predictive, and prescriptive.

Descriptive applications 22 include analytics dashboards and interactive data-mining tools. Still these applications enable an unprecedented view of the "big picture" for large and complex networks. Furthermore, they open the door to agile data exploration of diverse data sources that could not be looked at simultaneously and combined before.

Predictive applications 22 only require "read-only" access to network data and can leverage arbitrarily sophisticated ML to extract impactful insights. These range from network security and fraud detection, to network level and service level assurance, pre-emptive maintenance, troubleshooting assistance, root cause analysis, or network design optimization and planning. ML applications 22 have the potential reduce the cost of network operations amid an unprecedented time of increased complexity. They can also improve end-user experience and create new revenue opportunities for network service providers. The potential for innovation is particularly interesting when feeding ML applications 22 with inputs that were historically separate from each other but can now be accessed from the same data lake. For instance, ML could be used to quantify the risk of customer churn by combining network health and service level data with end-user and business data.

Prescriptive applications 22 employ a closed feedback loop and SDN automation. Prescriptive applications 22 enable what can be described as a "self-healing and self-learning network fueled by artificial intelligence" or an "adaptive network." Their use-cases are similar to the predictive applications above, except that ML insights can now be applied to the network in near-real time. This can give improved operational efficiency. However, it requires having full confidence that the ML insights are indeed reliable. Hence, it is expected that predictive applications may need to gain market acceptance first before prescriptive applications can be commonly deployed in production. During the transition period from predictive to prescriptive, ML applications can run in a hybrid mode in which their recommendations are reviewed by a human operator before they get automatically applied on the network.

Machine Learning System Results

Figure 5:
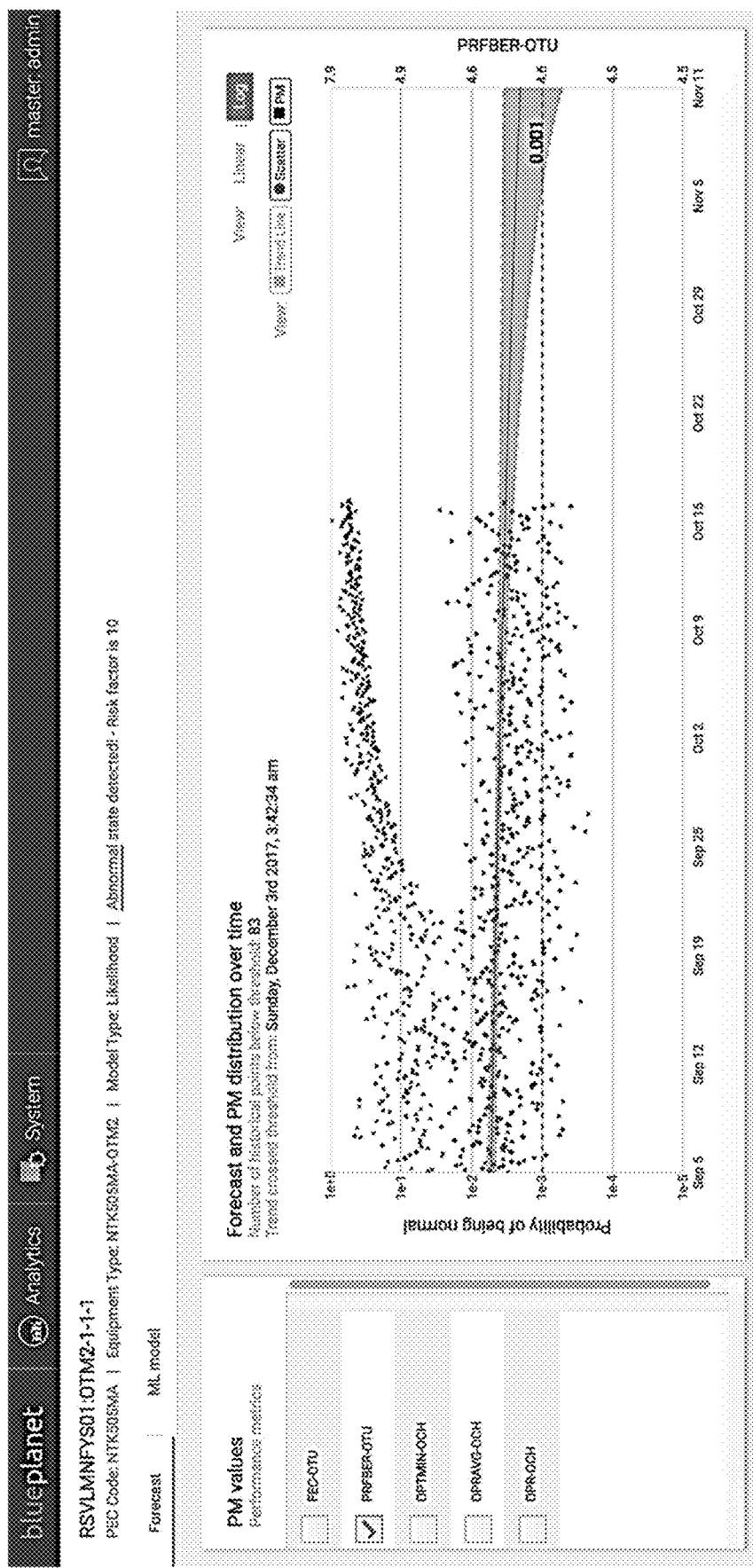
FIG. 5 is a graph of the forecasted probability of being normal ("p-value") using a 1st order (linear) polynomial, in a continuous degradation scenario.

FIG. 5 is a graph of the forecasted probability of being normal ("p-value") using a 1st order (linear) polynomial, in a continuous degradation scenario. In this example, the p-values are estimated using a Likelihood built from five (simulated) PM's, namely Forward Error Correction for an Optical Transport Unit (FEC-OTU), Pre-FEC Bit Error Rate for the OTU (PRFBER-OUT), Optical Power in for an Optical Channel (OPTIN-OCH), Optical Power received average for an Optical Channel (OPRAVG-OCH), and Optical Power for an Optical Channel (OPR-OCH). A downgrading trend is observed, dominantly coming from PRFBER-OTU.

Figure 6:
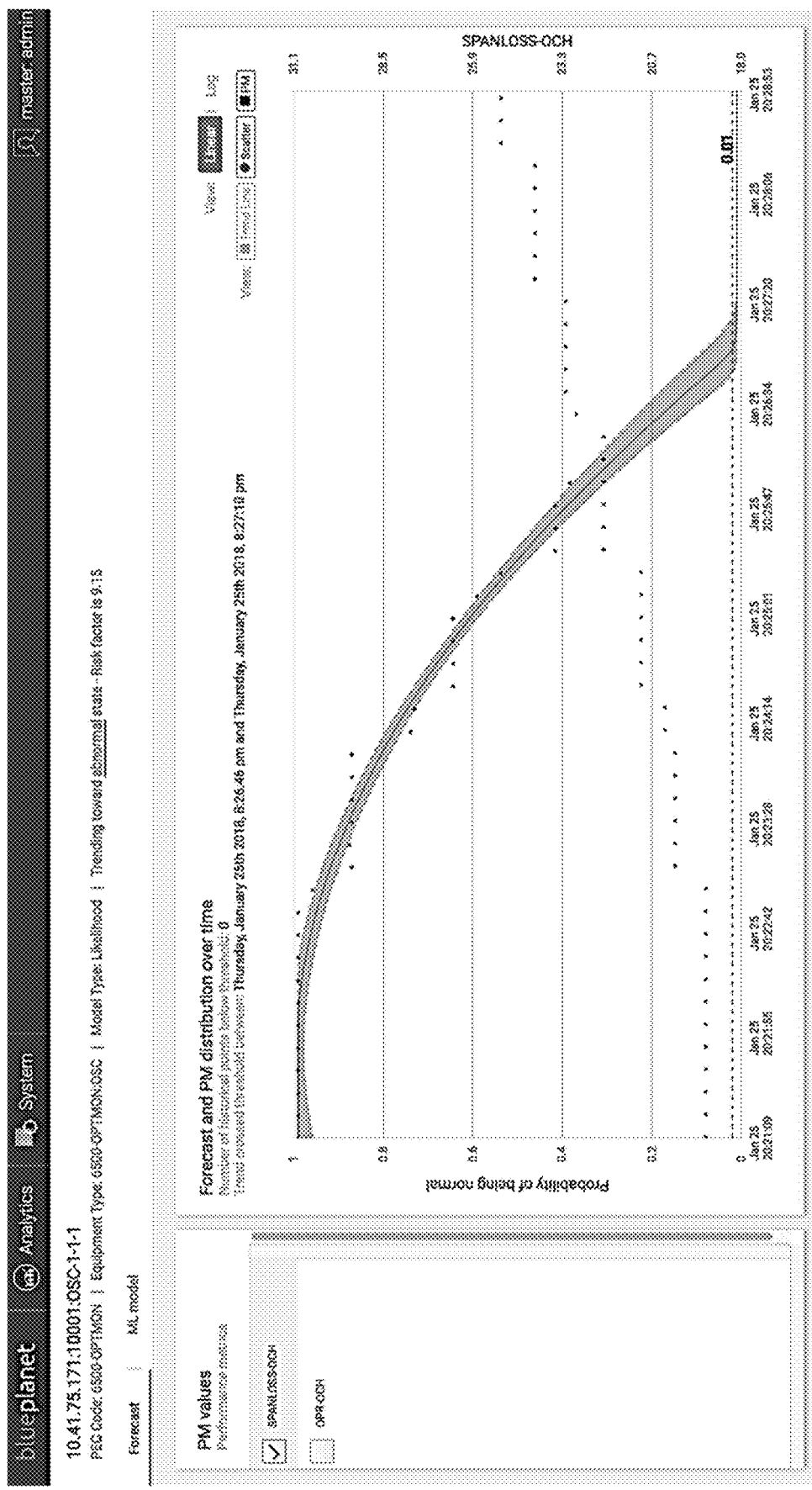
FIG. 6 is a graph of the forecasted probability of being normal ("p-value") using a 2nd order polynomial, in a continuous degradation scenario.

FIG. 6 is a graph of the forecasted probability of being normal ("p-value") using a 2nd order polynomial, in a continuous degradation scenario. In this example, the p-values are estimated using a Likelihood built from two PM's: Span loss for an Optical Channel (SPANLOSS-OCH) and OPR-OCH, measured from a real optical network. A downgrading trend is observed, predicting that network element will get into an abnormal state on January 25th, between 20 h26:46 and 20 h27:10.

Figure 7:
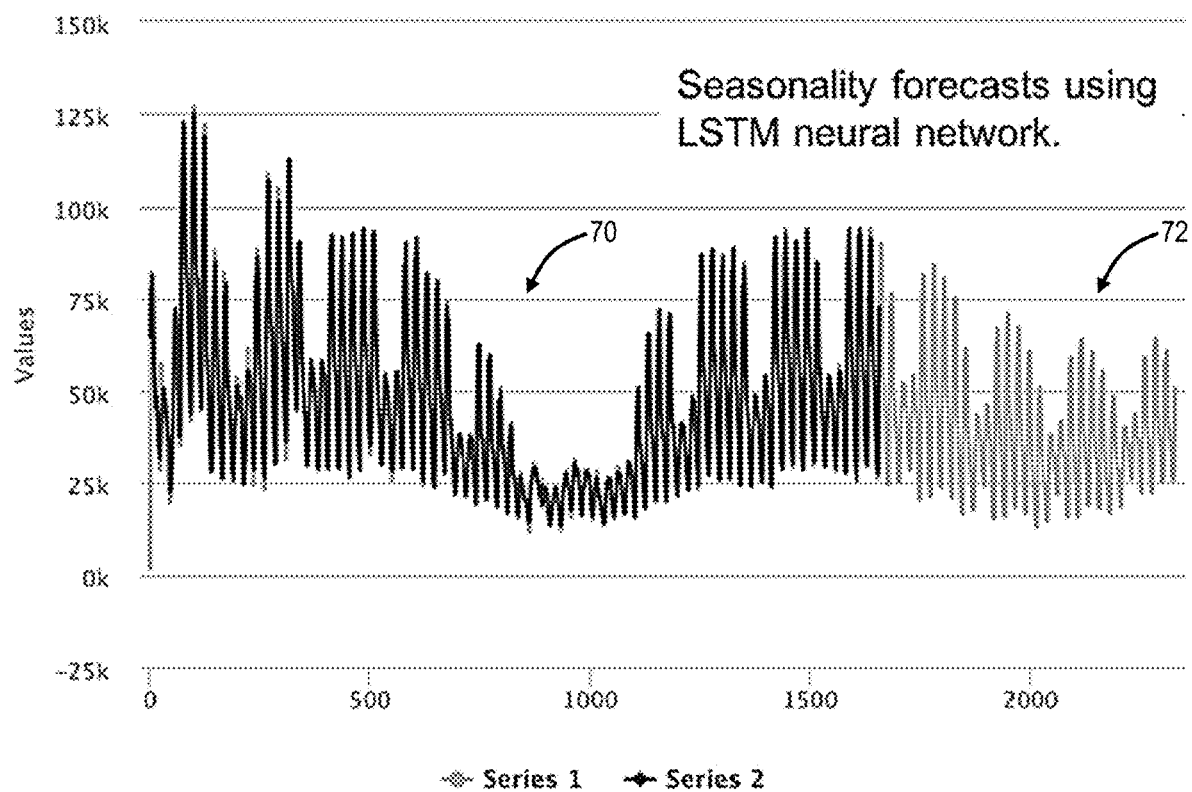
FIG. 7 is a graph of an example of a 1-dimensional time-series forecast using a Long Short-Term Memory (LSTM) neural network.

FIG. 7 is a graph of an example of a 1-dimensional time-series forecast using an LSTM neural network. The y-axis represents the global Internet traffic in Europe. The x-axis represents time in days. A black distribution 70 is the real data. A gray curve 72 is the forecast model. As can be seen, the LSTM forecast model is accurate to model seasonal effects. This is particularly valuable for the Service Health Predictor (SHP) application 22.

Those skilled in the art will recognize various different protocols and network layers can include various different PM metrics which can be combined, i.e., converting an n-dimensional time-series, n being a number of different types of PM data, into a 1-dimensional distribution; determining a graph based on the 1-dimensional distribution which graphs a probability of being normal over time.

Figure 8:
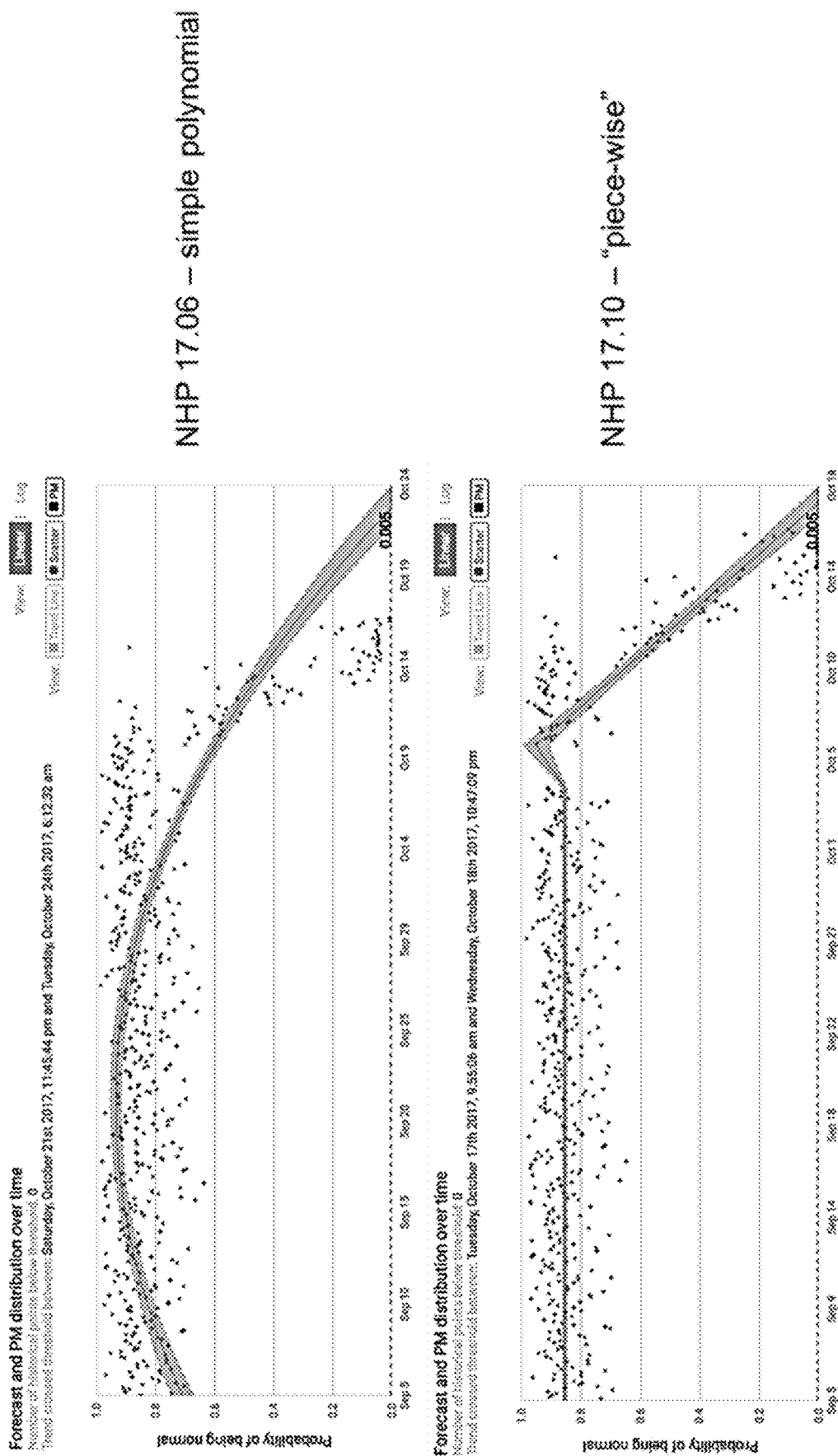
FIG. 8 are graphs of the forecasted probability of being normal ("p-value") using a 2nd order polynomial (top) versus a piece-wise combination of 1st order polynomials (bottom), in a scenario where device performance is stable for a while, then starts degrading continuously.

FIG. 8 are graphs of the forecasted probability of being normal ("p-value") using a 2nd order polynomial (top) versus a piece-wise combination of 1st order polynomials (bottom), in a scenario where device performance is stable for a while, then starts degrading continuously. As can be seen, the piece-wise model produces more accurate forecasts in this scenario.

Example Deployment

Figure 9:
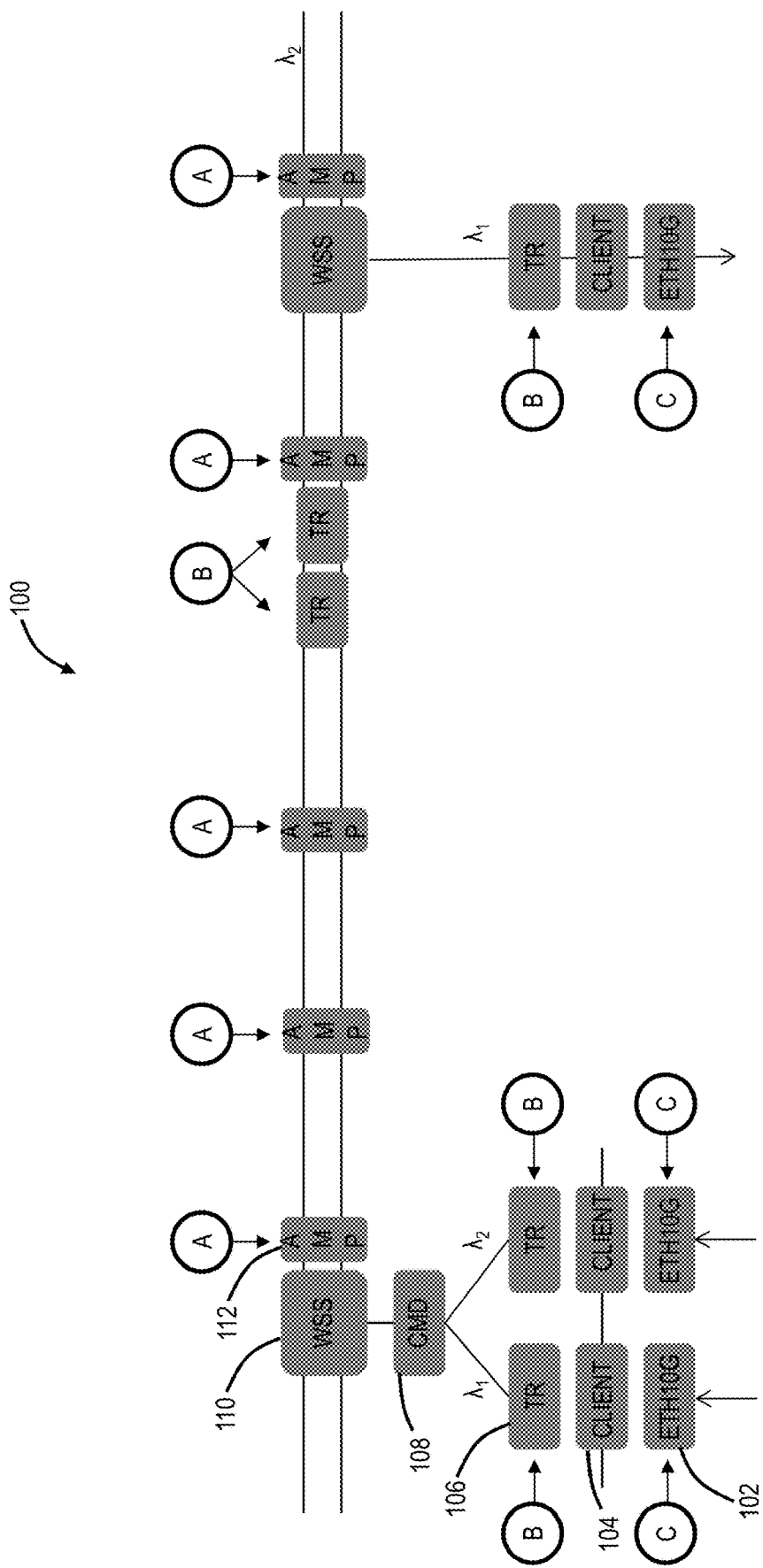
FIG. 9 is a block diagram of an example optical network for use with the machine learning system.
Figure 10:
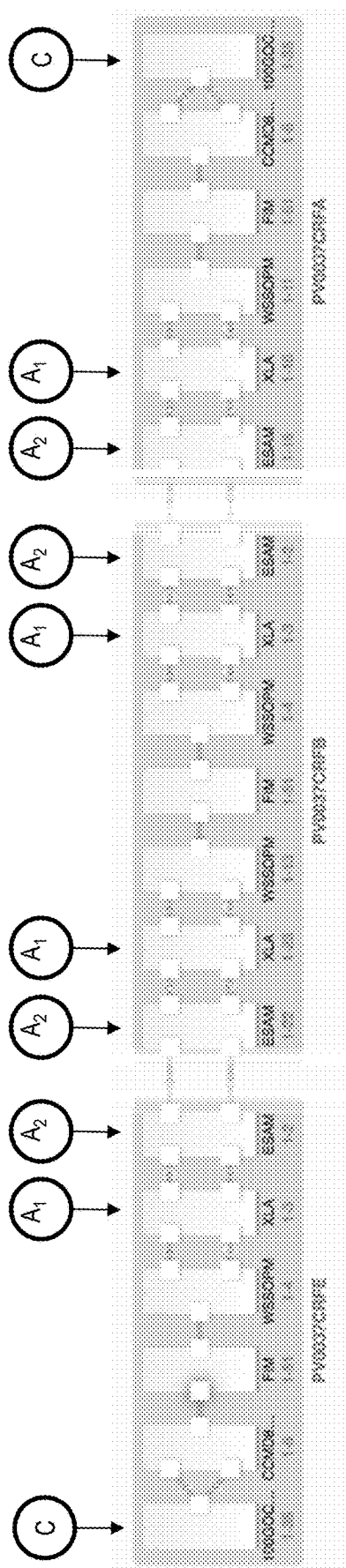
FIG. 10 is a block diagram of an example optical network segment.

FIG. 9 is a block diagram of an example optical network 100 for use with the machine learning system 10. Here, there are various components in an optical system communicating Ethernet 10G clients (ETH10G) 102 that connect to client transceivers 104. The client transceivers 104 can provide the clients 102 to an optical transceiver 106 (TR represents optical transceivers). For example, the client transceivers 104 can be short reach transceivers while the optical transceivers 106 can be configured for longer reach on the optical network 100. The optical transceivers 106 connect to a Channel Multiplexer/Demultiplexer 108 (CMD) which connects to a Wavelength Selective Switch (WSS) 110. Also, the optical network 100 includes various optical amplifiers 112. FIG. 10 is a block diagram of an example optical network segment.

In FIGS. 9 and 10, different PM data obtained is shown for A, B, C. A-type PM data represents optical power at amplifiers (Layer 0) including, for example:
A1) Optical Power Transmit for Each Amplifier
  Cards: Pre/Post amplifier, line amplifiers. Raman amplifiers, high power line amplifiers, etc.
  Facilities: Channel Monitor (CHMON), Network Media Channel Monitor (NMCMON) (CH for fixed grid, NMC for flexible grid)
  PM's:
    Optical Power Transmitted Average (in dBm)—Optical Channel (OPTAVG-OCH)
    Optical Power Transmitted Maximum (in dBm)—Optical Channel minus Optical Power Transmitted Minimum (in dBm)—Optical Channel (OPTMAX-OCH—OPTMIN-OCH)
A2) Power Loss after Each Span
  Cards: Amplifiers, Service modules, etc.
  Facilities: Optical Service Channel (OSC)
  PM's:
    SPANLOSSAVG-OCH
    (SPANLOSSMAX-OCH—SPANLOSSMIN-OCH)
B-type PM data represents optical signal degradation at a receiver (Layer 1) including, for example:
B1) Optical Power Received at the Physical Termination Point
  Cards: TR, Client, etc.
  Facilities: Precision Time Protocol (PTP), Optical Transport Module-3 (OTM3), OTM4, OTM, OTMC2
  PM's:
    OPRAVG-OCH
    (OPRMAX-OCH—OPRMIN-OCH)

Figure 11:
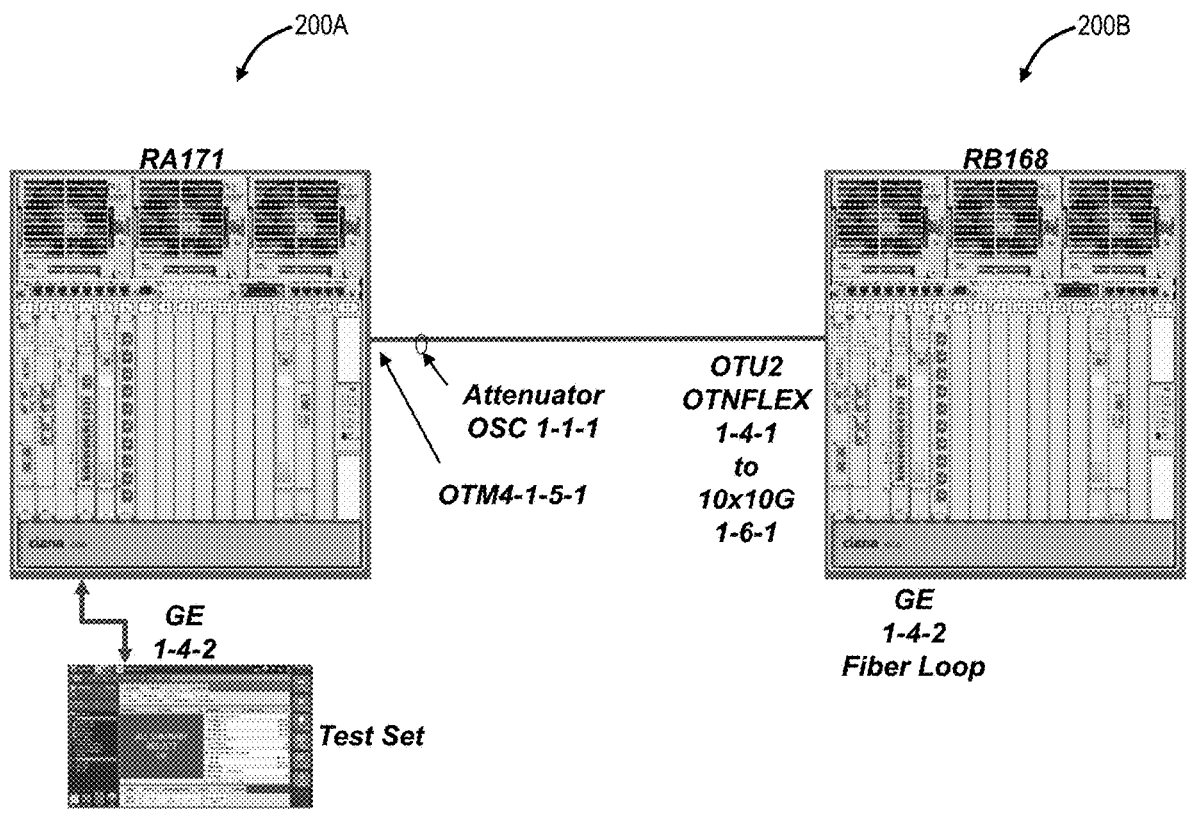
FIG. 11 is a network diagram of an optical network which was utilized to test the ML systems and methods.

B2) OTN Bit Error Rates
  Cards: OCLD, OTR, . . .
  Facilities: OTUTTP, OTM, OTM2, OTM3, OTM4, OTMC2
  PM's:
    QAVG-OTU
    QSTDEV-OTU
    CV-OTU
    ES-OTU
B3) SONET Error Rates
  Cards: 1×OC-192, 16×OC-n,
  Facilities: STTP, OC1, OC3, OC12, OC48, OC192, OC768, STM0, STM0J, STM1, STM1e, STM1J, STM4, STM4J, STM16, STM64, STM256, EC1
  PM's:
    CV-S or BBE-RS
    ES-S or ES-RS
C-type PM data represents data corruption at client ports (Layer 2) including, for example:
C1) Physical Coding Sublayer
  Cards: OTR, OTSC, OCI, 10×10 Mux,
  Facilities: ETTP, ETH, ETHN, ETH10G, ETH40G, ETH100, ETH100G, ETHFlex, Flex, WAN
  PM's:
    ES-PCS
    CV-PCS
C2) Ethernet Frames
  Cards: OTR, OTSC, OCI, 10×10 Mux,
  Facilities: ETTP, ETH, ETHN, ETH10G, ETH40G, ETH100, ETH100G, ETHFlex, Flex, WAN
  PM's:
    ES-E
    CV-E
    INFRAMESERR-E/INFRAMES-E
    OUTFRAMESERR-E/OUTFRAMES-E FIG. 11 is a network diagram of two network elements 200A, 200B in the optical network 100 which was utilized to test the ML systems and methods. Specifically, two WDM network elements 200A, 200B are connected with an optical link, each containing layer-0 (amplifier, Optical Service Channel (OSC)), layer-1 (OTM4) and layer-2 (FLEX GE) cards. There is a light attenuator in between the two WDM network elements. The traffic is generated by a test-set sending Ethernet packets.

In an embodiment, an ML application 22—the Network Health Predictor (NHP)—is executed with the Blue Planet Analytics (BPA) software platform (available from Ciena Corporation). The BPA platform is itself connected to a Hadoop cluster hosted in a private cloud, similarly to the architecture shown in FIG. 1.

In this demonstration, the optical network 100 was configured to reproduce what could happen in a production network over several days or weeks, but with "accelerated" time. The BPA software pulls PM data from each card every 10 seconds, using un-binned Transaction Layer 1 (TL1) counters (instead of using 15-minute binned data, usually). This data is transformed on the fly from its raw format to the NHP schema, using Spark-streaming pipelines, before being written to the Hadoop distributed file system (HDFS). The location of the data on HDFS is tracked by an entry in the dataset catalog of the BPA platform.

As a first step, data was collected for a few minutes while the network operations are normal. Then, this "normal conditions" dataset was fed to the NHP application to build an unsupervised ML model of this data by 1) building the 1-dimensional Probability Density Function (PDF) of each PM of each type of card on the network, and 2) combining all the relevant PDF's into a global Likelihood. This characterizes the network properties under normal conditions.

From then on, a so-called "recurring NHP analysis" is executed that examines new incoming data every five minutes, with a five-minute sliding window. Here again, this is an "accelerated time" version of NHP. In production, new incoming data would be typically re-analyzed every few hours using a sliding window of several days. Each port was analyzed independently, and the data used for this analysis are listed below in Table 1:

TABLE 1

| Layer 0 | |
|---|---|
| OPR-OCH | Optical power received - Optical Channel |
| SPANLOSS-OCH | Power loss through a span |
| Layer 1 | |
| QAVG-OTU | Average value of bit error rate (log) |
| QSTDEV-OTU | Standard deviation of bit error rate (log |
| Layer 2 | |
| Physical Coding Sub-layer | |
| CV-PCS | Number of code violations |
| ES-PCS | Number of errored seconds |
| UAS-PCS | Number of unavailable seconds |
| Ethernet | |
| INFRAMESERR-E | Number of input frame errors |
| ES-S | Number of errored seconds |
| UAS = E | Number of unavailable seconds |

For a given card and a given timestamp, the NHP analysis includes comparing a vector of incoming PM values from the live network with their expected values from the Likelihood model. Then derive a probability that such values could be obtained under normal conditions (a.k.a. "p-value"). This process is repeated for every timestamp, and the results are sorted in chronological order, to build a graph of "probability of being normal" (y-axis) versus time (x-axis). A regression algorithm is executed on the graph to measure the trend versus time for this port.

Finally, a Risk Factor ranging from zero (no problem) to ten (max probability of having a problem) can be derived from the combined information of the p-values and trend associated with a given port. This process is repeated for every port of every card in the network, each time an NHP analysis is executed. (Every five minutes in this case.)

To recap, all the end-user had to do was to train an ML model from a dataset, and start a recurring NHP analysis for new incoming data. These operations are enabled via with a user-friendly User Interface (UI). Only subject matter expertise required was to 1) ensure that the dataset used to train the ML was representative of normal conditions and 2) select appropriate PM's (Table 1) to be used for the analysis. Everything else is done by the ML completely unsupervised.

Figure 12:
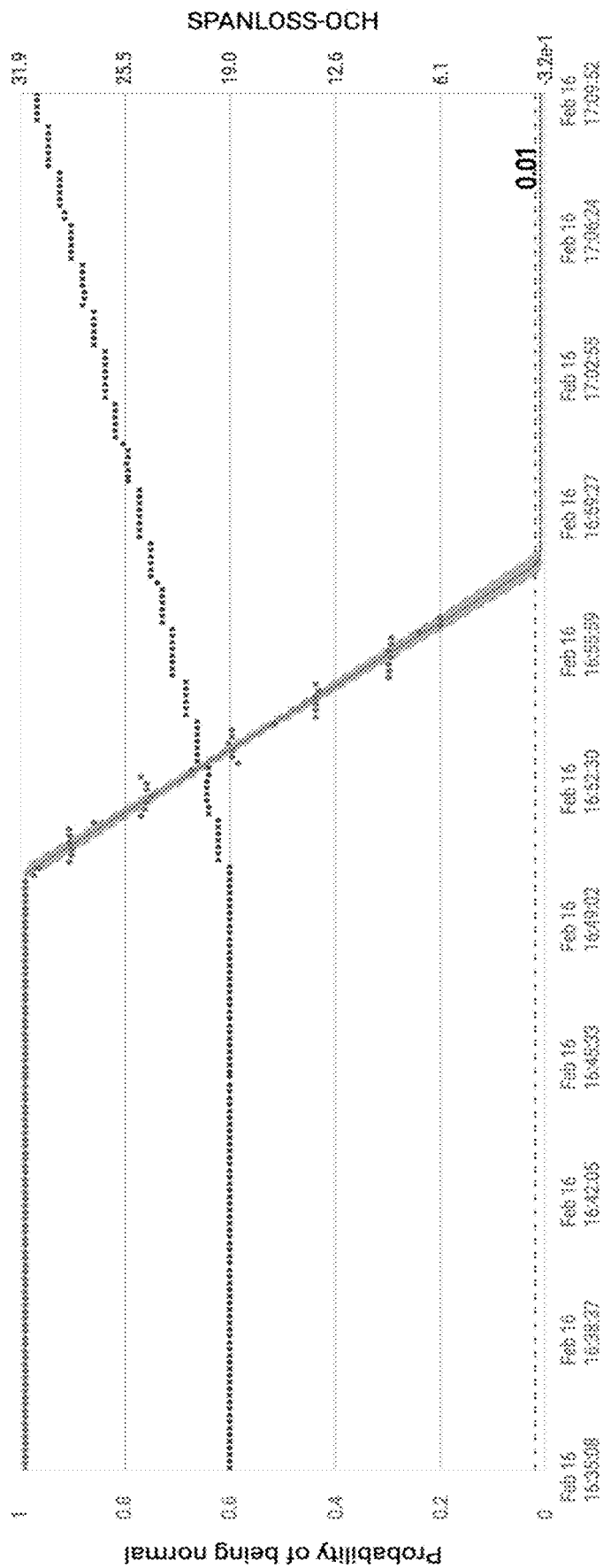
FIGS. 12-15 are graphs based on the introduction of network problems in the optical network of FIG. 11.
Figure 13:
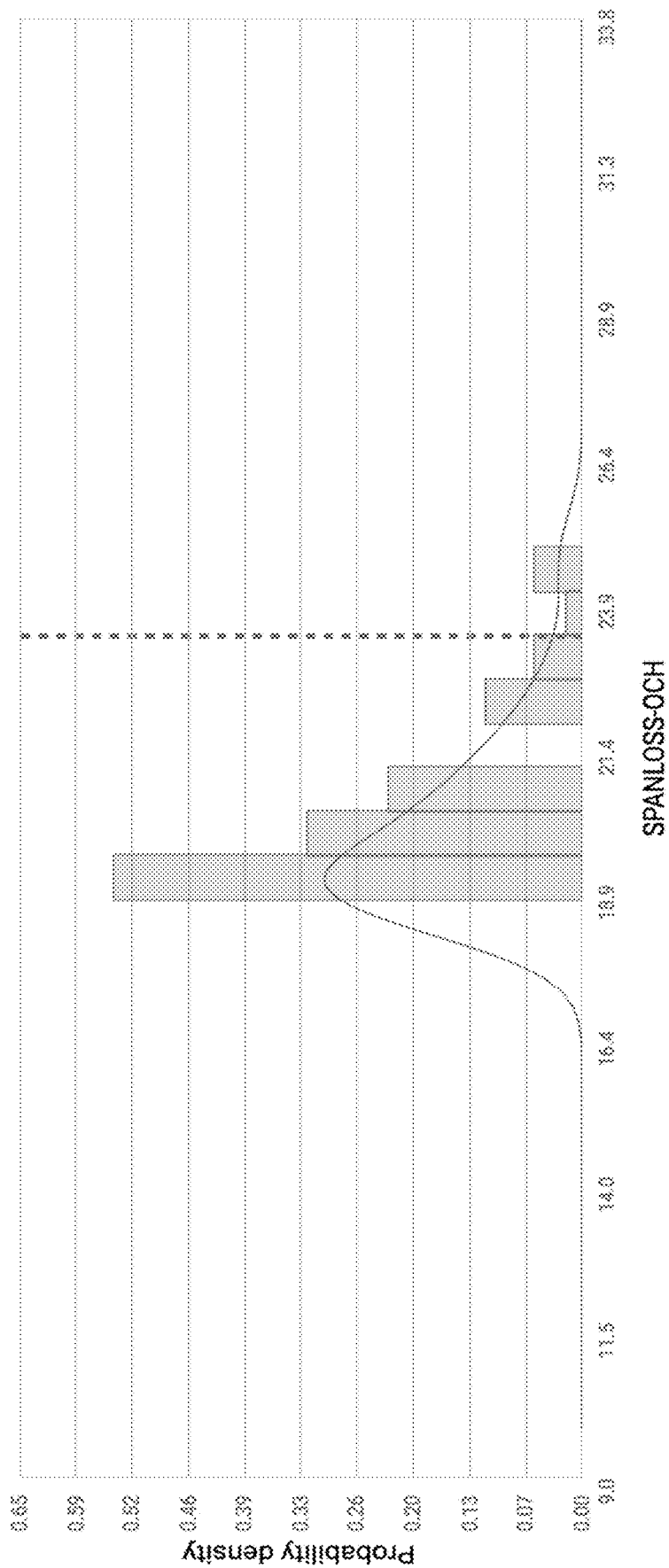
Figure 14:
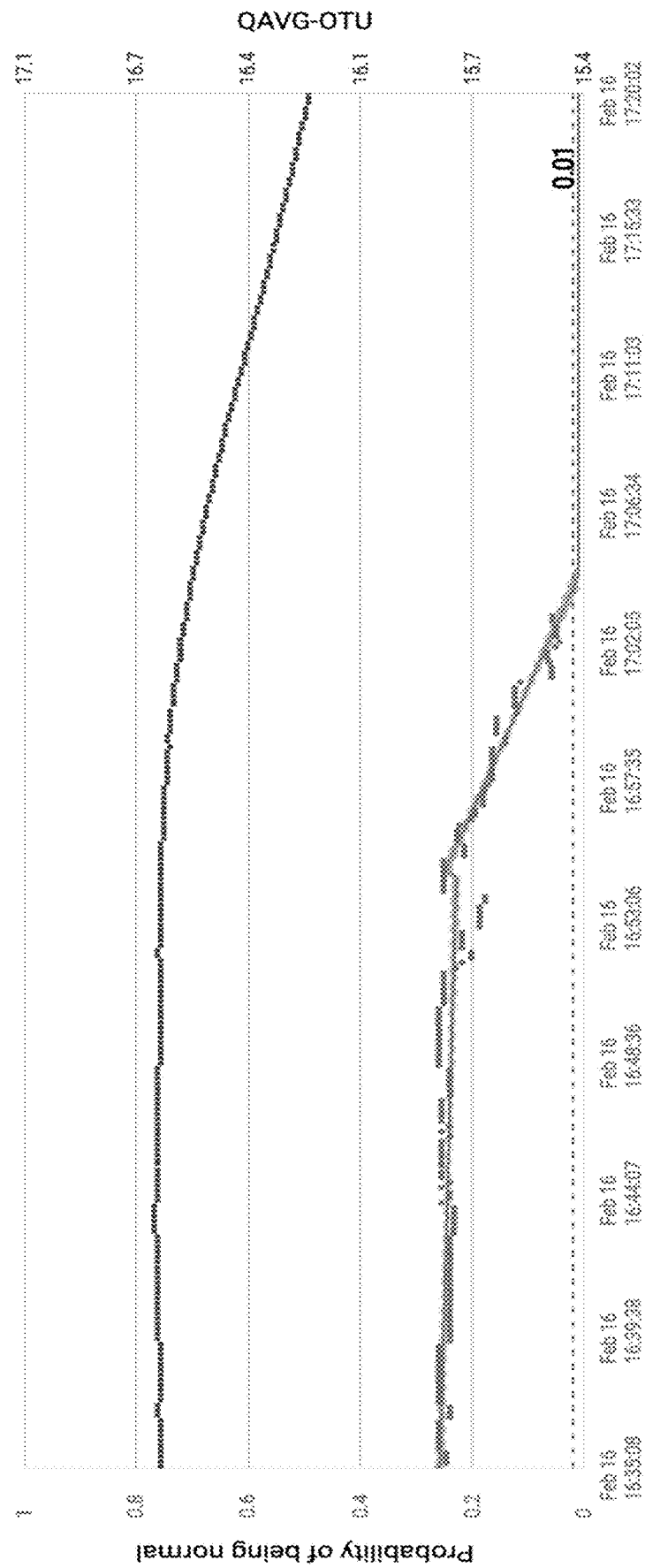
Figure 15:
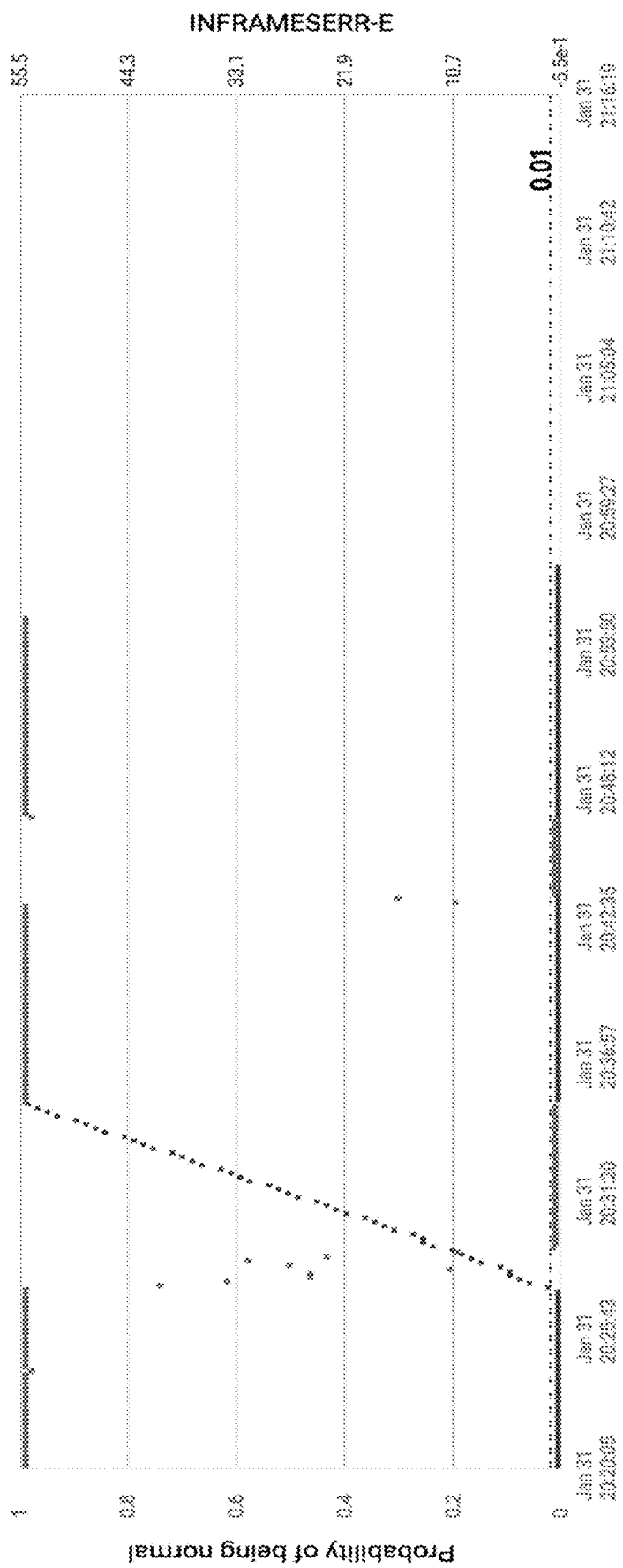

From this point, the remainder of the demonstration is to introduce various types of network problems, artificially in the lab, and observe how the ML application (NHP) reacts. These results are described as follows. FIGS. 12-15 are graphs based on the introduction of network problems in the optical network of FIG. 11. FIG. 12 is a forecast of SPANLOSS and FIG. 13 is a likelihood model of SPANLOSS. FIG. 14 is a forecast of the QAVG-OUT for an OTM34 and FIG. 15 is a forecast of input frame errors (Ethernet).

First, the light signal was progressively attenuated by up to 12 dB, hence mimicking the effect of fiber aging in "accelerated time." As can be seen on FIG. 12, the effect of fiber aging has been flagged with a Risk Factor of 9.1 on the optical line-side port OSC-1-1-1 (layer-0), on Feb. 16, 2018 between 16:35 and 17:03. This is because of PM's Span Loss and Optical Power Received (OPR). It is interesting to note that the port is not yet in a problematic state. As can be seen on FIG. 13 the value of SPANLOSS is not that unlikely. Yet the port is identified as being risky because of it is trending towards an abnormal state.

Also, very interesting is the fact that layer-1 port OTM4-1-5-1 (100 GE) was also flagged with a Risk Factor of 9.3. As can be seen in FIG. 14, this port was identified because of a different set of PM's, namely QAVG, QSTDEV and OPR. Here again, the problem was reported based on the trend, even if the network element is not yet in a problematic state. This demonstrates that unsupervised ML can enable pre-emptive maintenance, for the optical layer-0 and layer-1.

For the remaining of the demonstration, using an example of packet network components, four different types of Ethernet problems were introduced using the test set. As can be seen in FIG. 15, showing port FLEX-1-4-2 during two of these problems on Jan. 31, 2018, between 20:20 and 20:55. Ethernet Code Errors are injected from 20:26 to 20:35. Then a laser glitch happens from 20:42 to 20:48, approximately. Both problems were flagged by a Risk Factor 10 and a very low probability of being normal (<10-3), from to the combined information of 7 PM's: OPR, ES-PCS, input frame errors, ES-E, UAS-E, UAS-PCS, and CV-PCS. However, it is very interesting to see that the different problems affected different raw PM's. As can be seen in FIG. 15, the Ethernet code errors produced input frame errors, but the laser glitch did not. Conversely, the laser glitch produced UAS-PCS errors, but not the code errors.

In general, various problems tested in the lab were flagged by the NHP risk factors, but each resulted in different raw PM patterns. These results are summarized in Table 2.

TABLE 2

| Raw PM | Line-side light attenuation Fiber aging | Frame Check Sequence Bursts Malfunctioning case | Code Errors Loosely connected port, dirty fibers | Laser glitch |
|---|---|---|---|---|
| SPANLOSS | ↑ | — | — | — |
| Optical Power Transmitted | — | — | — | — |
| Optical Power Received | ↓ | — | — | ↓ |
| INFRAMES Error | — | ↑ | ↑ | — |
| Errored Seconds, Ethernet | — | ↑ | ↑ | — |
| Errored Seconds, PCS | — | — | ↑ | — |
| Code Violations, PCS | — | — | ↑ | — |
| Unavailable Seconds, PCS | — | — | — | ↑ |

The following Table 3 provides some example PM data which can be used herewith:

TABLE 3

| | |
|---|---|
| CV-PCS | Code violation, physical coding sublayer |
| DFR-E | Discarded frames, Ethernet |
| DROPGAINAVG-OTS | Drop Gain Average - Optical Transmission Section |
| DROPGAINMAX-OTS | Drop Gain Maximum - Optical Transmission Section |
| DROPGAINMIN-OTS | Drop Gain Minimum - Optical Transmission Section |
| DROPGAIN-OTS | Drop Gain - Optical Transmission Section |
| ES-E | Errored seconds, Ethernet |
| ES-ODU | Errored seconds, optical channel data unit |
| ES-OTU | Errored seconds, optical channel transport unit |
| FC-ODU | Failure count, optical channel data unit |
| FCSERR-E | FCS errors, Ethernet |
| FEC-OTU | Forward error correction, optical channel transport unit |
| HCCS-OTU | High correction count seconds, optical channel transport unit |
| INFRAMES-E | In frames, Ethernet |
| INFRAMESERR-E | In errored frames, Ethernet |
| OPINAVG-OTS | Optical Return Loss Average (in dB) - Optical Transmission Section |
| OPINMAX-OTS | Optical Return Loss Maximum (in dB) - Optical Transmission Section |
| OPINMIN-OTS | Optical Return Loss Minimum (in dB) - Optical Transmission Section |
| OPIN-OTS | Optical Return Loss (in dB) - Optical Transmission Section |
| OPOUTAVG-OTS | Optical Power Output Average (in dBm) - Optical Transmission Section |
| OPOUTMAX-OTS | Optical Power Output Maximum (in dBm) - Optical Transmission Section |
| OPOUTMIN-OTS | Optical Power Output Minimum (in dBm) - Optical Transmission Section |
| OPOUT-OTS | Optical Power Output (in dBm) - Optical Transmission Section |
| OPRAVG-OCH | Optical power received Average - Optical Channel |
| OPRMAX-OCH | Optical power received Maximum - Optical Channel |
| OPRMIN-OCH | Optical power received Minimum - Optical Channel |
| OPRN-OCH | Optical power received Normalized - Optical Channel |
| OPR-OCH | Optical power received - Optical Channel |
| OPTAVG-OCH | Optical Power Transmitted Average (in dBm) - Optical Channel |
| OPTMAX-OCH | Optical Power Transmitted Maximum (in dBm) - Optical Channel |
| OPTMIN-OCH | Optical Power Transmitted Minimum (in dBm) - Optical Channel |
| OPTN-OCH | Optical Power Transmitted Normalized (in dBm) - Optical Channel |
| OPT-OCH | Optical Power Transmitted (in dBm) - Optical Channel |
| ORLAVG-OTS | Optical Return Loss Average (in dB) - Optical Transmission Section |
| ORLMAX-OTS | Optical Return Loss Maximum (in dB) - Optical Transmission Section |
| ORLMIN-OTS | Optical Return Loss Minimum (in dB) - Optical Transmission Section |
| ORL-OTS | Optical Return Loss (in dB) - Optical Transmission Section |
| OUTFRAMES-E | Remote out frames, Ethernet |
| OUTFRAMESERR-E | Out errored frames, Ethernet |
| PFBERE-OTU | Post-FEC bit error rate estimate, optical channel transport unit |
| PRFBERMAX-OTU | Max Pre-FEC bit error rate, optical channel transport unit |
| PRFBER-OTU | Pre-FEC bit error rate, optical channel transport unit |
| SEFS-OTU | Severely errored frame seconds, optical channel transport unit |
| SES-E | Severely errored seconds, Ethernet |
| SES-ODU | Severely errored seconds, optical channel data unit |
| SES-OTU | Severely errored seconds, optical channel transport unit |
| UAS-E | Unavailable seconds, Ethernet |
| UAS-ODU | Unavailable seconds, optical channel data unit |
| UAS-PCS | Unavailable seconds, physical coding sublayer |
| BBES | Background Block Errors Seconds |
| BBE-SFE | Background Block Error Section Layer Far End. |
| CORRFEC | Corrected FEC - This is the count of the corrected number of bits |
| CSES | Consecutive Severely Errored Seconds |
| CSESL | Consecutive Severely Errored Seconds Line |
| CV | Coding Violations |
| CVL | Coding Violations Line |
| ES | Errored Seconds |
| ESL | Errored Seconds Line |
| ESS | Errored seconds, Section layer |
| ES-SFE | Errored Seconds Section Layer Far End |
| LBC | Laser Bias Current |
| OPR | Optical Power Received |
| OPT | Optical Power Transmitted |
| SEFS | Severely errored frame second |

TABLE 3-continued

| | |
|---|---|
| SEMS | Severely errored, multiframed seconds |
| SES | Severely Errored Seconds Line |
| SESL | Severely Errored Seconds Line |
| SESS | |
| SES-SFE | Severely Errored Seconds Section Layer Far End |
| UAS | Unavailable Seconds |
| UASL | Unavailable Seconds Line Layer |
| UASS | |
| CV-ODU | Code violation, optical channel data unit. |
| CV-OTU | Code violation, optical channel transport unit |

Server

Figure 16:
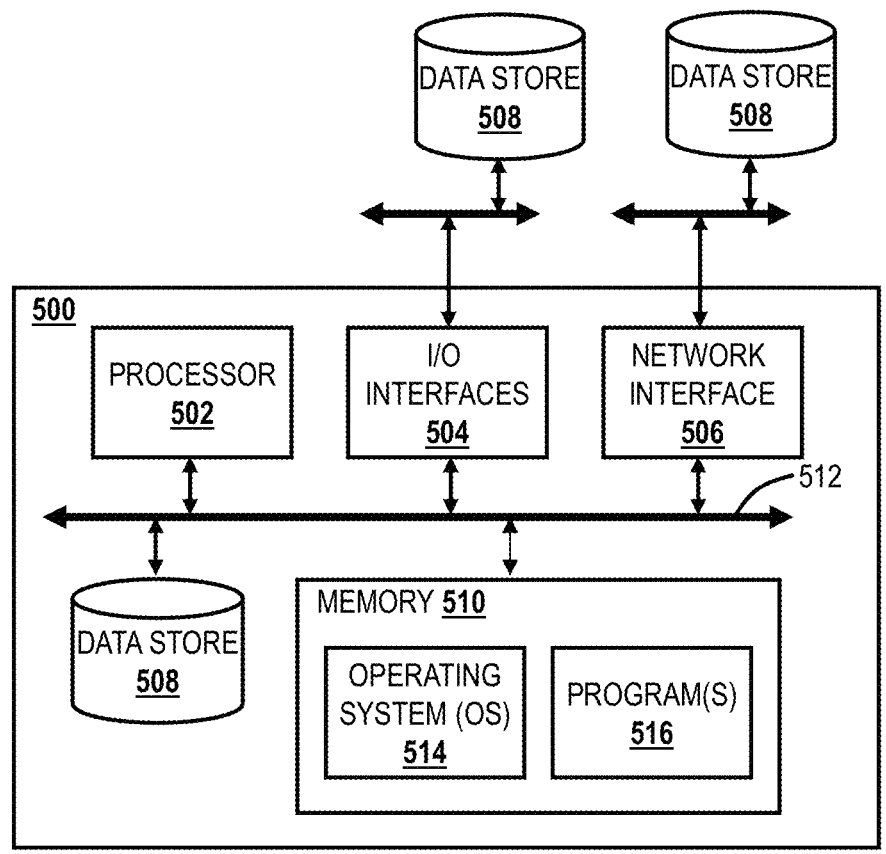
FIG. 16 is a block diagram of a server which may be used to implement the machine learning system and the machine learning process.

FIG. 16 is a block diagram of a server 500 which may be used to implement the machine learning system 10 and the machine learning process. The server 500 can implement the various processes associated with the systems and methods described herein. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 15 depicts the server 500 in an oversimplified manner, and practical embodiments may include additional components and suitably configured processing logic to support known or conventional operating features that are not described in detail herein. The components (502, 504, 506, 508, and 510) are communicatively coupled via a local interface 512. The local interface 512 may be, for example, but not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chip set), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate over a network, such as the Internet, a wide area network (WAN), a local area network (LAN), and the like, etc. The network interface 506 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500 such as, for example, an internal hard drive connected to the local interface 512 in the server 500. Additionally, in another embodiment, the data store 508 may be located external to the server 500 such as, for example, an external hard drive connected to the I/O interfaces 504 (e.g., SCSI or USB connection). In a further embodiment, the data store 508 may be connected to the server 500 through a network, such as, for example, a network attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Labeled Data

As described herein, (raw) data can be consumed by a series of automated machine learning applications 22. However, in its raw form, the data can only support unsupervised ML (such as clustering or trending) or Reinforcement Learning (RL) tasks, but it cannot support supervised ML which requires labeled data. This is a severe limitation because the supervised ML algorithms (such as deep neural networks) tend to produce the most detailed and most accurate insights for many problems (such as network health diagnostics). Furthermore, even for unsupervised ML or RL, it is often necessary to get labeled data in order to benchmark (measure) the accuracy of the algorithms.

A "label" is an additional piece of information that characterizes the true state of a data source at the time it produced some performance monitoring (PM) data. Labels typically convey higher-level insights such as: "this network element is currently behaving normally," "this card is currently malfunctioning," "this link is congested," "this optical fiber has bad quality," etc. A series of raw PM data with label(s) forms a labeled dataset. In turn, a labeled dataset can be used to (1) train supervised ML algorithms to recognize data patterns associated with each type of label and/or (2) measure the accuracy of algorithms in presence of a given label-type of data.

While the value of labeled datasets is clear, the problem is that creating them can be relatively difficult. This is especially true in telecommunications network environments where the subject-matter expertise to know the true network status versus the know-how to write data-labeling software and the access to the raw data usually resides in different teams that do not necessarily talk to each other.

The systems and methods focus on overcoming the challenges associated with the creation and utilization of labeled datasets in a telecommunications network environment.

Problems and Solutions with Labeled Datasets

The first challenge with labeled datasets originating from telecommunication networks is that their creation is very difficult to automate. A human expert must take the time to input his or her insights about the network manually, which is rather inefficient, tedious and expensive. To address this, two solutions are provided.

Figure 17:
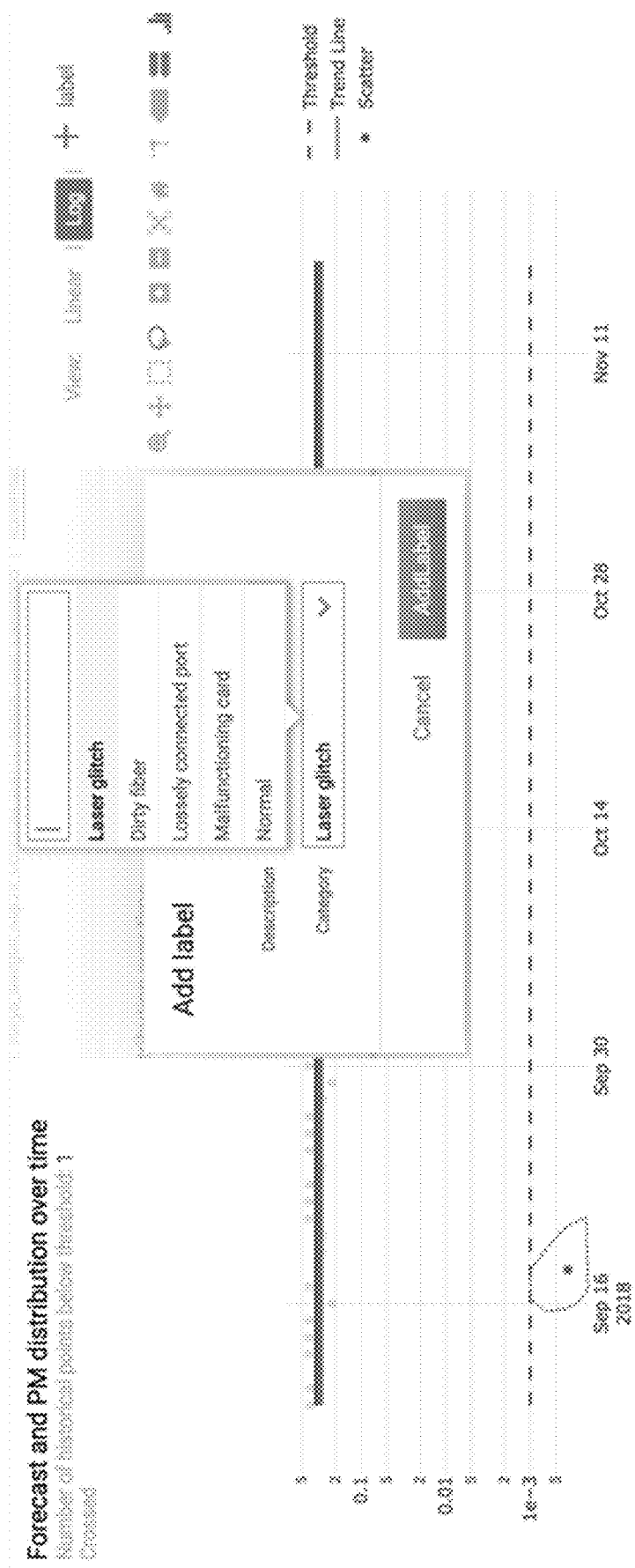
FIG. 17 is a screenshot of a GUI for indicating a single point in time is an anomaly and to add a corresponding label
Figure 18:
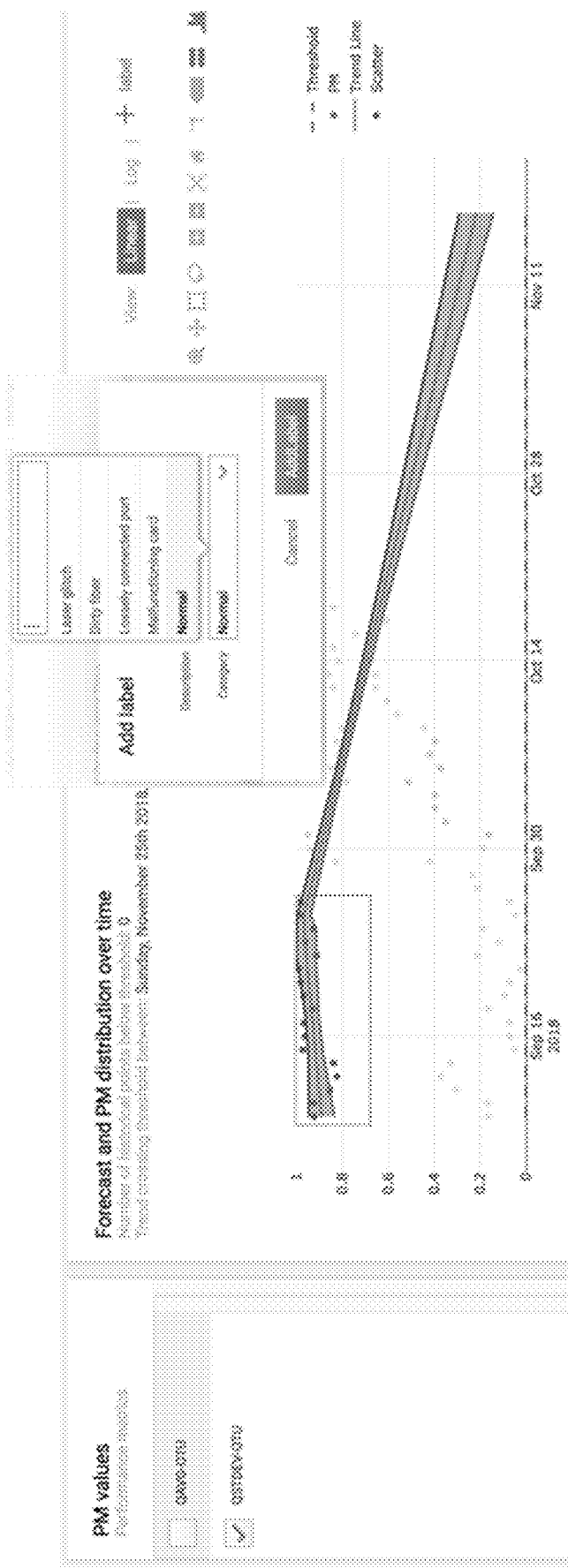
FIG. 18 is a screenshot of a GUI for indicating that a network element behaves normally for a portion of a time-series to add a corresponding label.
Figure 19:
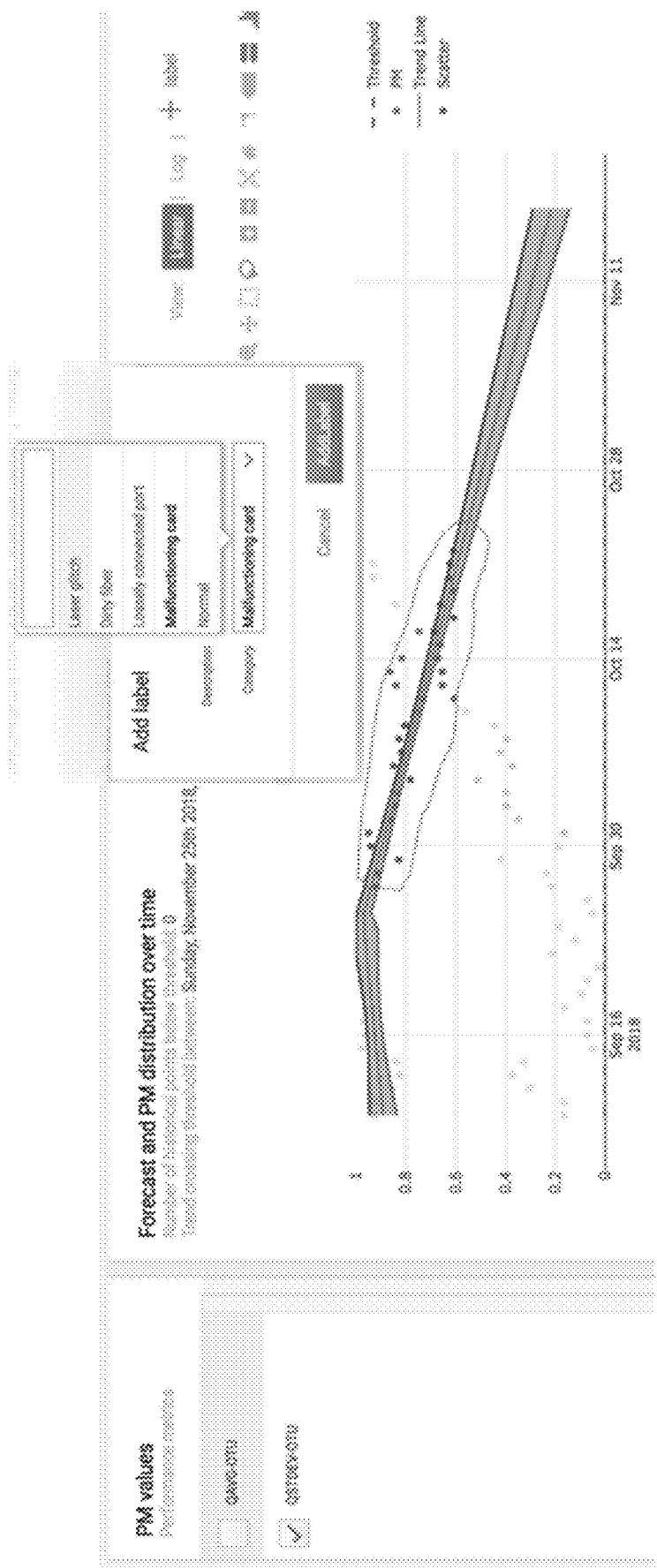
FIG. 19 is a screenshot of a GUI for indicating that a network element is malfunctioning for a portion of a time-series to add a corresponding label.

First, an efficient and user-friendly interface is provided for human-experts to input labels. FIG. 17 is a screenshot of a GUI for indicating a single point in time is an anomaly and to add a corresponding label. FIG. 18 is a screenshot of a GUI for indicating that a network element behaves normally for a portion of a time-series to add a corresponding label. FIG. 19 is a screenshot of a GUI for indicating that a network element is malfunctioning for a portion of a time-series to add a corresponding label.

Figure 20:
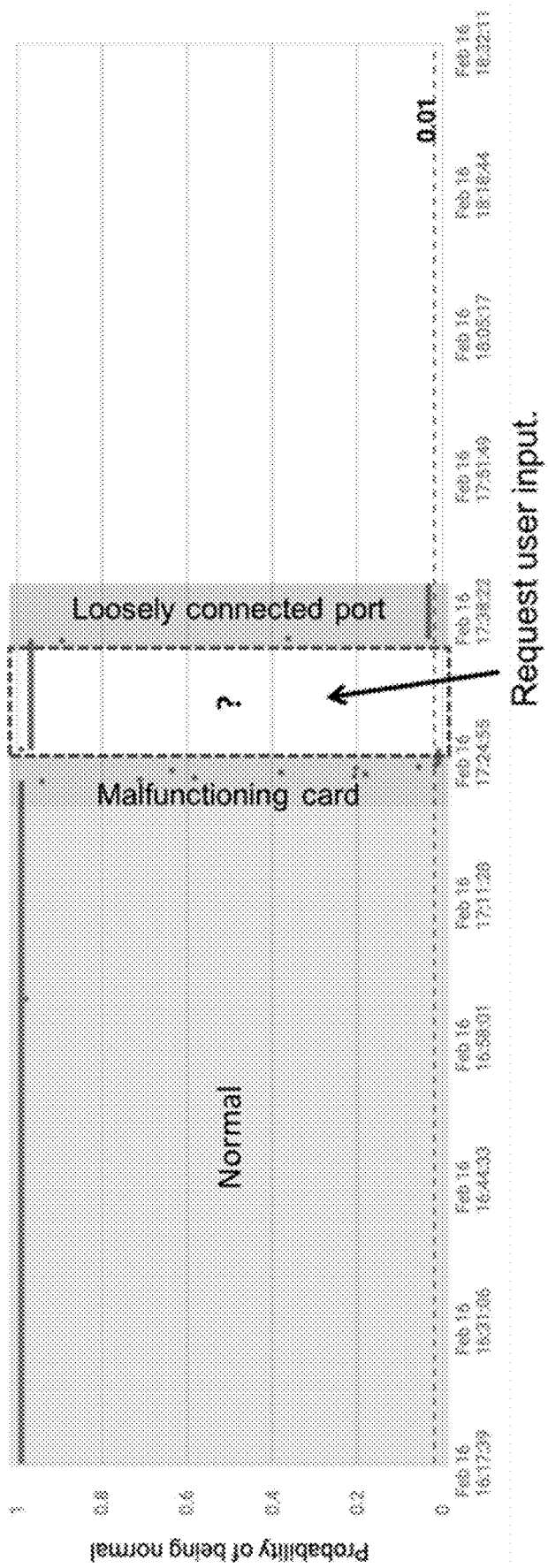
FIG. 20 is a screenshot of a GUI for visualizing labels overlaid with historical data and inferred insights.
Figure 21:
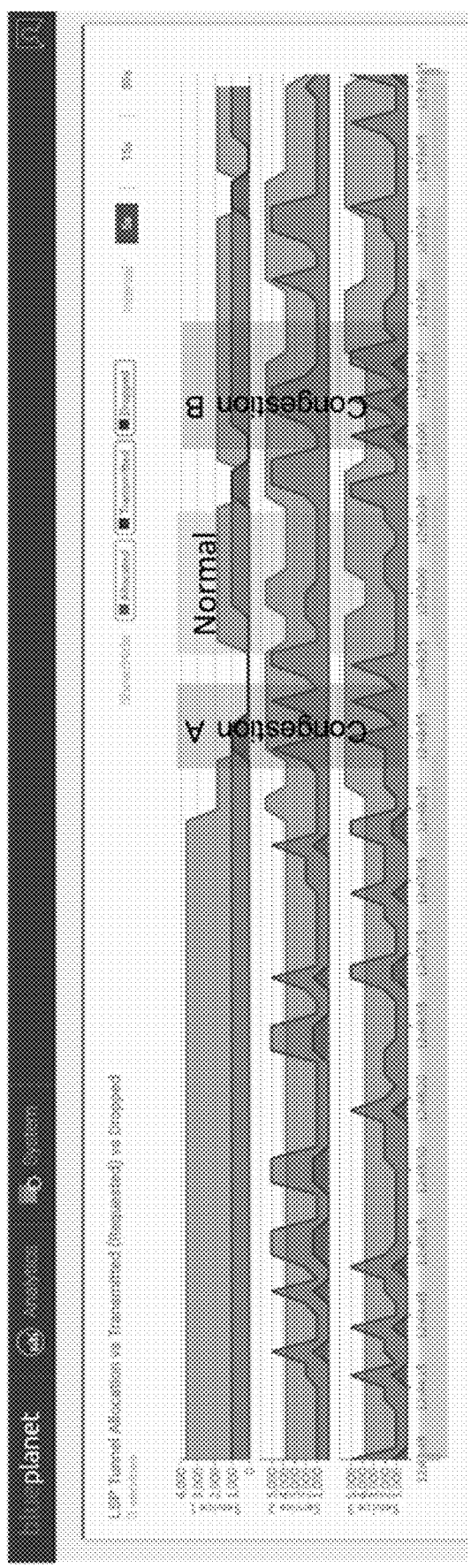
FIG. 21 is a screenshot of a GUI for applying the same concepts to a variety of applications, from infrastructure risk assessment (above) to network traffic (this figure), and others.

The key features of this GUI are:

end-user must be able to enter labels for multiple time points in one click label information can be visually overlaid with insights from ML applications label information can be visually overlaid with raw PM data list of label types is pre-defined by an admin from a "settings" menu Second, as illustrated in FIGS. 20-21, the systems and methods guide the human-expert, so he/she concentrates his/her attention on the most important elements. FIG. 20 is a screenshot of a GUI for visualizing labels overlaid with historical data and inferred insights. This provides the ability to proactively and automatically request user feedback for data where the inference results are ambiguous. FIG. 21 is a screenshot of a GUI for applying the same concepts to a variety of applications, from infrastructure risk assessment (above) to network traffic (this figure), and others.

The systems and methods use active learning software that proactively requests inputs from users for cases where ML inference is not conclusive (and would benefit from additional "supervised" training), but not otherwise. Hence guiding human-experts to provide most benefits with least effort.

Figure 22:
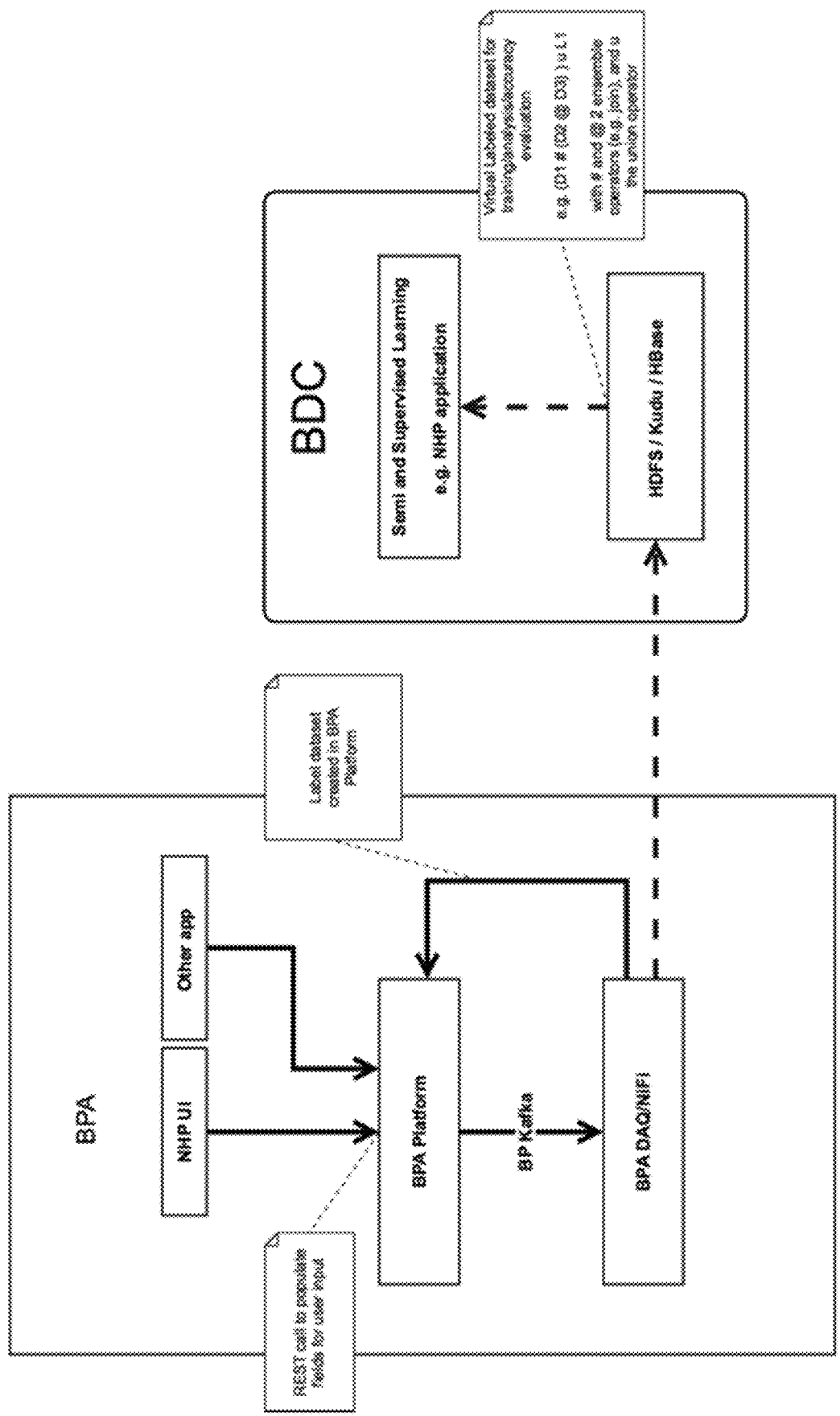
FIG. 22 is a diagram of a system for label management.

Third, if the logic to enter labels automatically exists, the systems and methods expose POST, GET, UPDATE, DELETE APIs that can be used programmatically. For instance, it is conceivable that information from alarms, ticketing or customer-support systems may be used to add labels to particular raw data automatically. To do so, the systems and methods propose to use a specific architecture illustrated in FIG. 22 to store and read back the label information, such that labels can be efficiently re-used for multiple tasks. These labels are exposed via an SQL interface for consumption by machine learning tasks. In particular, frameworks like Apache Drill or Apache Spark Dataframes allow optimal queries based on user, application or label type on top of Big Data ecosystems like Hadoop.

A second challenge with data labeling in the telecoms industry is that different teams have the subject-matter expertise to know the true network status versus the know-how to write data-labeling software and the access to the raw data. To address this, the systems and methods can share the same efficient and user-friendly GUI for network operators to input labels and for planner or data scientist teams to consume the labels.

Examples of Telecoms Use-Cases for Labels

TABLE 4

Examples of labels associated with telecoms use-cases.

| Use-case | Example of labels |
| --- | --- |
| Universal | "normal" |
| | "abnormal" |
| Risk assessment of network equipment | "Loosely connected port" |
| | "Bended fiber" |
| | "Malfunctioning card" |
| | "service-affecting issue" |
| Service assurance | "Traffic congestion" |
| | "Sub-optimal path" |
| | "SLA violation" |
| Applications Quality of Experience | "Video buffering" |
| | "User changed channel" |
| | Etc. |

A few examples of labels associated with telecoms use-cases are listed in the above table. This list can be extended, to characterize everything one may wish ML applications to learn about or everything we may need to benchmark accuracy against.

Prior to this disclosure, it was only possible to use supervised ML with simulated data. Now, the system and methods enable the training of supervised ML applications and the benchmarking of ML accuracy from real data collected in production networks.

Process for Predicting Events in a Telecommunications Network

Figure 23:
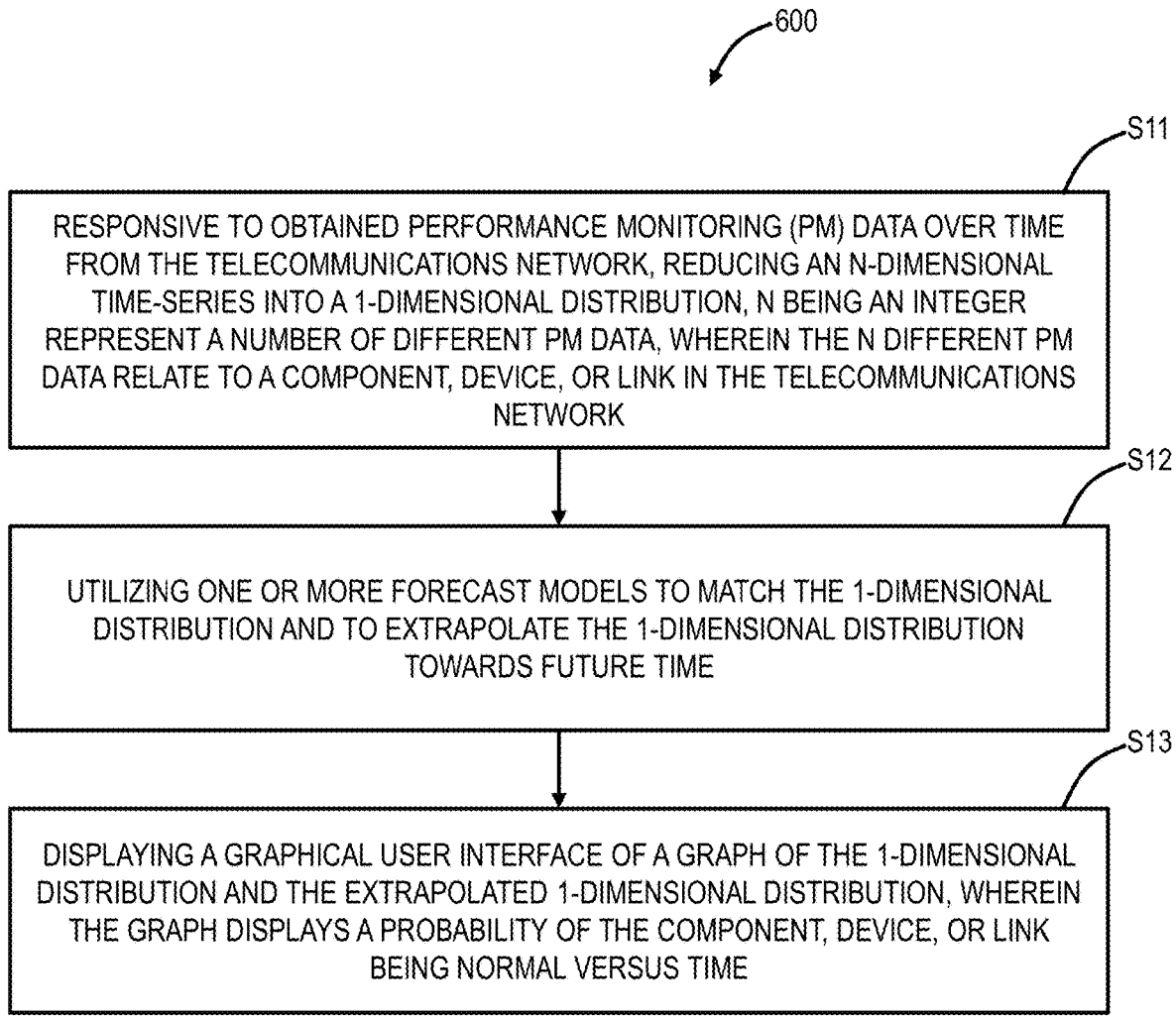
FIG. 23 is a flowchart of a process for predicting events in a telecommunications network.

FIG. 23 is a flowchart of a process 600 for predicting events in a telecommunications network. The process 600 includes, responsive to obtained Performance Monitoring (PM) data over time from the telecommunications network, reducing an n-dimensional time-series into a 1-dimensional distribution, n being an integer represent a number of different PM data, wherein the n different PM data relate to a component, device, or link in the telecommunications network (step S11); utilizing one or more forecast models to match the 1-dimensional distribution and to extrapolate the 1-dimensional distribution towards future time (step S12); and displaying a graphical user interface of a graph of the 1-dimensional distribution and the extrapolated 1-dimensional distribution, wherein the graph displays a probability of the component, device, or link being normal versus time (step S13).

The process 600 can further include continually obtaining the PM data over time; and continually updating the graph based thereon. The n-dimensional time-series can be reduced to the 1-dimensional distribution by converting each time bin for each of the n different PM data into a single number a probability of being normal (a "p-value"). The converting can utilize a 1st or 2nd order polynomial for scenarios in which performance of the component, device, or link is degrading continuously, a piece-wise combination of the 1st or 2nd order polynomials for scenarios in which the performance is first stable, then starts degrading, and a Long Short-Term Memory (LSTM) neural network or Autoregressive Integrated Moving Average (ARIMA) model for scenarios in which the performance varies with seasonal effects.

The process 600 can further include providing an alert with a recommended remedial action based on the extrapolated 1-dimensional distribution. The process 600 can further include providing the graphical user interface to display some or all of the PM data over time, receiving an input from corresponding users with labels assigned to the some or all of the PM data over time, and storing the some or all of the PM data over time and associated labels for machine learning applications. The telecommunications network can include any of optical network elements, Time Division Multiplexing (TDM) network elements, and packet network elements.

Automatic Data Labeling

PM data in the telecommunications network 16, for example, are generated in bins (time bins), such as every 15 minutes, every day, etc. Various examples of PM data are described herein. For context, production networks are in place—one with about 100,000 ports and one with about 50,000 ports, and the PM data has over 80 million data points over less than 5 months. Larger networks will have ever increasing data. Even further, these 80 million data points only had 10 issues which were anomalies. Clearly this is a large amount of data and labeling by hand is unrealistic and impractical.

Figure 24:
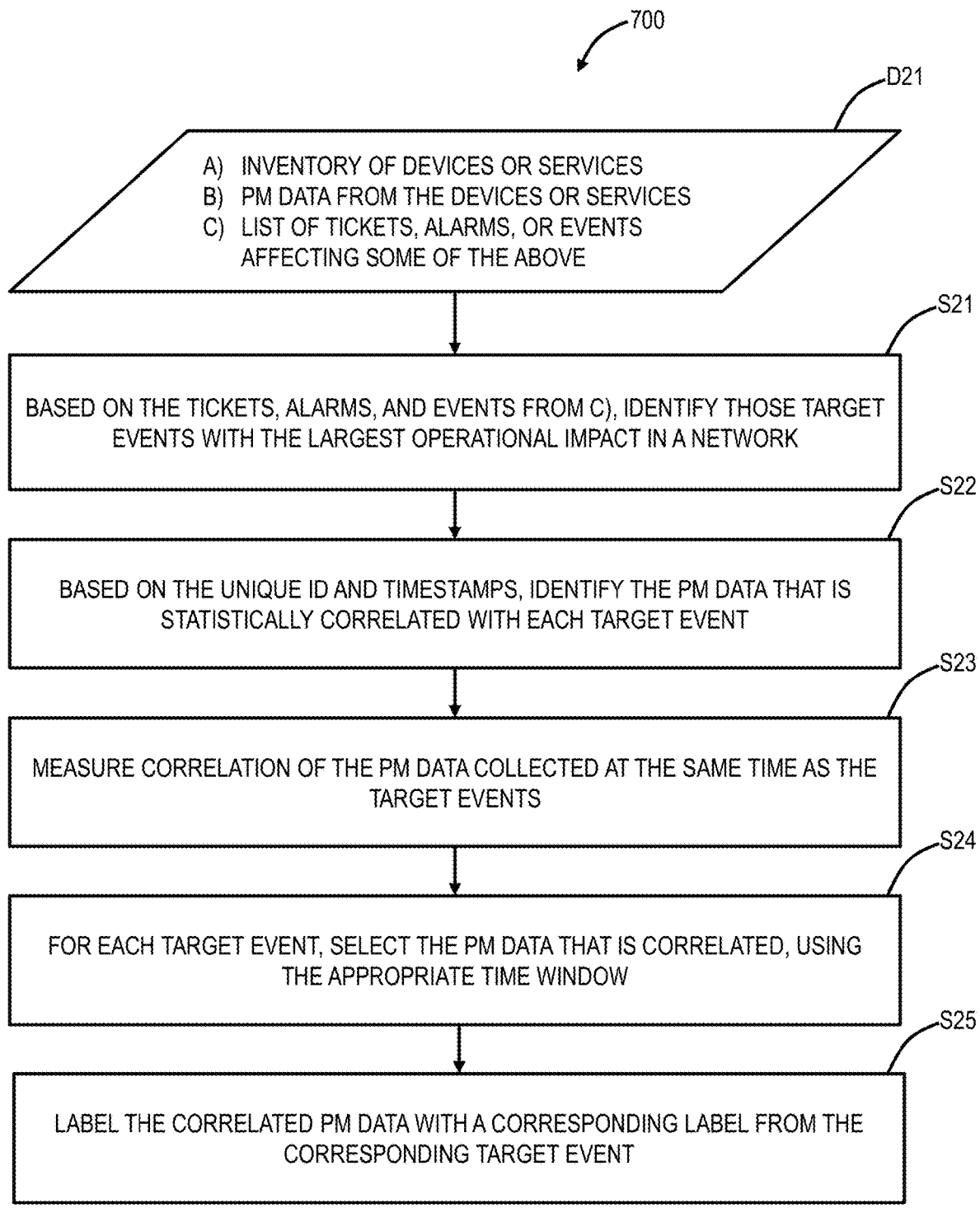
FIG. 24 is a flowchart of an automatic data labeling process for obtaining and creating labeled data for a telecommunications network.

FIG. 24 is a flowchart of an automatic data labeling process 700 for obtaining and creating labeled data for a telecommunications network. The labeled data is then used to train machine learning processes which can be used in production networks to proactively identify anomalies for remedial action.

The automatic data labeling process 700 includes obtaining data including A) an inventory of devices or services associated with a unique Identifier, B) PM data collected from the devices or services along with associated timestamps, and C) a list of tickets, alarms or events affecting some of the above devices or services, associated with a timestamp at which the event started and ended (step D21). As described here in devices can be physical or virtual, e.g., the devices 14 in the telecommunications network 16. The objective of the automatic data labeling process 700 is to associate labels based on the list of tickets, alarms or events with correlated PM data.

The tickets, alarms, or events can be collected automatically from popular systems such as Netcool (from IBM) or Infovista (from Infovista), or Network Management System (NMS) such as OneControl (from Ciena Corporation), MCP (from Ciena Corporation), MDSO (from Ciena Corporation), ROA (from Ciena Corporation), and others. Likewise, the PM data can be collected automatically from an NMS, an SDN controller, or from the devices directly. The PM data can also be collected from a database, log system, etc.

The automatic data labeling process 700 includes, based on the tickets, alarms, and events from C) in step D21, identifying those target events with the largest operational impact in a telecommunications network 16 (step S21). Here, target events are used to denote all of the tickets, alarms, and events. A target event is one that has a large operational impact. Here, the selection is to select training data. As such, it is advantageous to identify target events to capture as much as possible in terms of what may be encountered in a production network. Training a machine learning process includes providing training data with labeled data so that the machine learning process can detect similar occurrences later.

The output of step S21 includes one or more target events which are characterized by a start time and an end time and are seen in the tickets, alarms, and events. Next, the automatic data labeling process 700 includes, based on the unique identifiers and timestamps, identifying the PM data that is statistically correlated with each of the one or more target events (step S22). This can be performed using the standard Pearson correlation formula or using more sophisticated approaches. One may require a minimum of Alarms and PM measurements (say at least 10 values) in order to provide statistically significant results. The unique identifiers are used to identify the devices or services and the timestamps are used for the correlation.

The automatic data labeling process 700 includes measuring correlation of the PM data collected at the same time as each of the one or more target events as well as measuring correlation of the PM data collected before each of the one or more target events (step S23). Step S23 can be performed for the PM data collected at incrementally long time periods before the corresponding target event, as a scan, until no correlation can be observed.

The automatic data labeling process 700 includes, for each of the one or more target events, selecting only the PM data that was correlated, using the appropriate time window (step S24). The automatic data labeling process 700 includes labeling the selected PM data based on the corresponding target event (step S25). Examples of labels are listed in Table 4. Particularly, the label provides meaningful context to an operator. In Table 4, the labels are defined for different use cases. Universally, a label can be normal, operation as expected, or abnormal, operation below expectation. Further, there can be labels associated with specific concerns such as risk assessment of network equipment (i.e., potential hardware or software problem), service assurance (i.e., potential problem in the end user service), application Quality of Experience (QoE) (i.e., potential end user quality issues), etc.

The goal of the label is to define the context such that a concrete action can be taken proactively. Of course, the universal labels provide high-level context—normal versus abnormal. This may not provide the granularity to the operator, a management plane, a control plane, an SDN controller, an orchestrator, etc. for concrete remedial (corrective) actions.

On the other hand, the other example use cases—risk assessment of network equipment, service assurance, application QoE, etc. are more specific and provide meaningful context. For example, a label of a "loosely connected port" can provide a concrete remedial action to instruct an operator to have the port connection checked. Also, a "malfunctioning card" can instruct the operator to have the card replaced and sent back to a manufacturer for testing and replacement. Generally, the risk assessment of network equipment requires service personnel in the field to perform a check and possible maintenance. The risk assessment of network equipment is meant to identify for correction hardware and software issues prior to failure or faults.

The use cases of service assurance and application QoE provide similar proactive support in the context of identifying network configuration issues that may impact end user experience. Here, the remedial actions may be automated without service personnel, such as via the management plane, the control plane, the SDN controller, the orchestrator, etc. The goal here is to reconfigure the network 16 to alleviate congestion, non-optimal paths, Service Layer Agreement (SLA) violations, poor video quality, etc.

The idea here with the risk assessment of network equipment, the service assurance, the application QoE, etc. is to catch issues prior to them becoming service-affecting. That is, proactive remedial action versus reactive remedial action such that network availability and end user experience is improved.

The automatic data labeling process 700 can be executed by a software application that is capable to produce labeled dataset automatically. These labeled datasets can be used to train machine learning models able to identify target events/ alarms, or even predict them ahead of time, solely from patterns in PM data. The same labeled datasets can also be used to benchmark the accuracy of machine models.

Of note, the systems and methods described herein including the automatic data labeling process 700 are not vendor-specific and can be used to analyze any type or manufacture of the devices 14 in the telecommunications network 16. Also, there is no requirement for detailed level subject matter expertise. The objective to label data is to collect PM data and have high-level guidance about the most important alarms/events to target.

Automatic Labeling and Machine Learning Process

Figure 25:
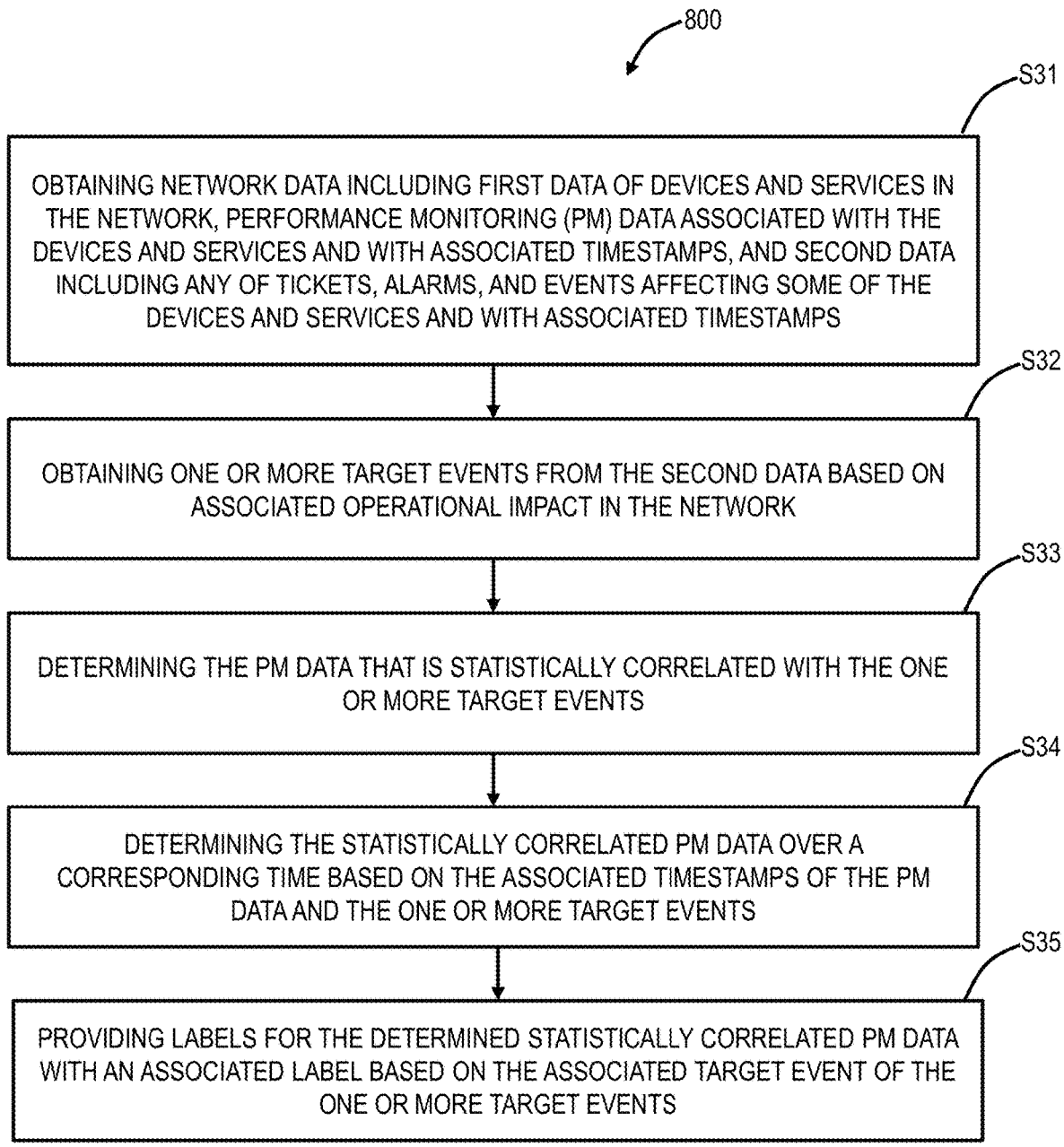
FIG. 25 is a flowchart of an automatic labeling and machine learning process for use in labeling PM data and detecting specific anomalies in a telecommunications network.

FIG. 25 is a flowchart of an automatic labeling and machine learning process 800 for use in labeling PM data and detecting specific anomalies in a telecommunications network 16. The automatic labeling and machine learning process 800 includes obtaining network data including first data of devices and services in the network, Performance Monitoring (PM) data associated with the devices and services and with associated timestamps, and second data including any of tickets, alarms, and events affecting some of the devices and services and with associated timestamps (step S31); obtaining one or more target events from the second data based on associated operational impact in the network (step S32); determining the PM data that is statistically correlated with the one or more target events (step S33); determining the statistically correlated PM data over a corresponding time based on the associated timestamps of the PM data and the one or more target events (step S34); and providing labels for the determined statistically correlated PM data with an associated label based on the associated target event of the one or more target events (step S35).

The automatic labeling and machine learning process 800 can include utilizing a set of labeled data based on the provided labels to train a machine learning process. The automatic labeling and machine learning process 800, subsequent to training a machine learning process with a set of labeled data based on the provided labels, obtaining second PM data based on current operation of the network; processing the second PM data via the machine learning process; and obtaining predictions from the machine learning process based on labels associated with the set of labeled data. The determining statistical correlation can include measuring correlation of the PM data at a same time as each of the one or more target events and measuring the correlation of the PM data for prior time bins as each of the one or more target events.

The network 16 can include any of optical network elements, Time Division Multiplexing (TDM) network elements, Wavelength Division Multiplexing (WDM) network elements, and packet network elements. The devices 14 in the network 16 can include a plurality of disparate types of devices from a plurality of equipment vendors. The associated label can be based on one or more of a risk assessment of network equipment, service assurance, and application Quality of Experience (QoE).

Example Implementation of Automatic Labeling and Machine Learning

The automatic labeling and machine learning process 800 was utilized to predict the unplanned loss of a signal 1-5 days ahead of time, for three different facilities of a networking device (in this example, a Ciena 6500 packet-optical device). The three different facilities include an Ethernet service (ETH), an Optical Transport Module (OTM) that provides an optical wavelength, and an optical monitor (OPTMON) that monitors performance. The results showed remarkable accuracy in advance of a failure.

Also, note, the automatic labeling and machine learning process 800 can be used to identify events such as "new channel add" that would typically be associated with statistical "anomalies" in the PM data, but are actually perfectly normal from a network operations viewpoint. Identifying these events helps reduce the false positive rate.

Table 5 below shows predictions of unplanned loss of signal predictions for various cards obtained with a supervised machine learning model (neural network) trained with automatically labeled data from a customer's network using the automatic labeling and machine learning process 800. The ability to predict these outages accurately is extremely valuable customers.

TABLE 5

|  | Diagnostic (same day) | Forecast (1-5 days before) |
| --- | --- | --- |
| OPTMON cards | | |
| Accuracy | (95 ± 3)% | (92 ± 3)% |
| Precision | (99 ± 3)% | (97 ± 3)% |
| Sensitivity | (90 ± 7)% | (88 ± 7)% |
| False Alarm | (0.2 ± 0.8)% | (3 ± 3)% |
| OTM cards | | |
| Accuracy | >95% | >95% |
| Precision | >95% | ~90% |
| Sensitivity | >95% | >95% |
| False Alarm | <1% | <1% |
| ETH cards | | |
| Accuracy | (96 ± 2)% | (79 ± 3)% |
| Precision | >95% | ~90% |
| Sensitivity | >95% | ~60% |
| False Alarm | (2 ± 2)% | (2 ± 2)% |

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system comprising:
a processor; and
memory storing instructions that, when executed, cause the processor to
obtain network data including first data of devices and services in the network, Performance Monitoring (PM) data associated with the devices and services and with associated timestamps, and second data including any of tickets, alarms, and events affecting some of the devices and services and with associated timestamps, wherein the PM data indicates at least one of received optical power, transmitted optical power, forward error correction bit errors, or ethernet errors and code violations,
obtain one or more target events from the second data based on associated operational impact in the network,
determine the PM data that is statistically correlated with the one or more target events using a machine learning process,
determine the statistically correlated PM data over a corresponding time based on the associated timestamps of the PM data and the one or more target events,
assign an automatically generated label to the statistically correlated PM data using the machine learning process,
request user input related to the statistically correlated PM via a Graphical User Interface (GUI) for a portion of the statistically correlated PM data adjacent to the assigned automatically generated label for which inference results are ambiguous and the automatically generated label cannot therefore be assigned, and
utilize a set of labeled data including the assigned automatically generated label and the user input to train the machine learning process.

2. The system of claim 1, wherein the memory storing instructions that, when executed, cause the processor to
subsequent to training a machine learning process with a set of labeled data based on the provided labels, obtain second PM data based on current operation of the network,
process the second PM data via the machine learning process, and
obtain predictions from the machine learning process based on labels associated with the set of labeled data.

3. The system of claim 1, wherein the statistical correlation includes measuring correlation of the PM data at a same time as each of the one or more target events and measuring the correlation of the PM data for some prior time bins before each of the one or more target events.

4. The system of claim 1, wherein the network includes any of optical network elements, Time Division Multiplexing (TDM) network elements, Wavelength Division Multiplexing (WDM) network elements, and packet network elements.

5. The system of claim 1, wherein the devices in the network include a plurality of disparate types of devices from a plurality of equipment vendors.

6. The system of claim 1, wherein the associated label is based on one or more of a risk assessment of network equipment, service assurance, and application Quality of Experience (QoE).

7. The system of claim 1, wherein the memory further stores instructions that, when executed, cause the processor to automatically carry out a remedial action responsive to the assigned automatically generated label and the user input.

8. The system of claim 1, wherein the PM data indicates multiple of received optical power, transmitted optical power, forward error correction bit errors, and ethernet errors and code violations.

9. The system of claim 8, wherein the statistically correlated PM data indicates each of received optical power, transmitted optical power, forward error correction bit errors, and ethernet errors and code violations that are each statistically correlated with the one or more target events as determined using the machine learning process.

10. The system of claim 1, wherein the PM data indicates a plurality of optical power received via an optical channel, power loss through a span, an average value of bit error rate, a standard deviation of bit error rate, a number of code violations from a physical coding sub-layer, a number of errored seconds from the physical coding sub-layer, a number of unavailable seconds from the physical coding sub-layer, a number of ethernet input frame errors, a number of ethernet errored seconds, and a number of ethernet unavailable seconds.

11. A method comprising:
obtaining network data including first data of devices and services in the network, Performance Monitoring (PM) data associated with the devices and services and with associated timestamps, and second data including any of tickets, alarms, and events affecting some of the devices and services and with associated timestamps, wherein the PM data indicates at least one of received optical power, transmitted optical power, forward error correction bit errors, or ethernet errors and code violations;
obtaining one or more target events from the second data based on associated operational impact in the network;
determining the PM data that is statistically correlated with the one or more target events using a machine learning process;
determining the statistically correlated PM data over a corresponding time based on the associated timestamps of the PM data and the one or more target events;
assigning an automatically generated label to the statistically correlated PM data using the machine learning process,
requesting user input related to the statistically correlated PM data via a Graphical User Interface (GUI) for a portion of the statistically correlated PM data adjacent to the assigned automatically generated label for which inference results are ambiguous and the automatically generated label cannot therefore be assigned, and
utilizing a set of labeled data including the assigned automatically generated label and the user input to train the machine learning process.

12. The method of claim 11, further comprising
subsequent to training a machine learning process with a set of labeled data based on the provided labels, obtaining second PM data based on current operation of the network;
processing the second PM data via the machine learning process; and
obtaining predictions from the machine learning process based on labels associated with the set of labeled data.

13. The method of claim 11, wherein the determining statistical correlation includes measuring correlation of the PM data at a same time as each of the one or more target events and measuring the correlation of the PM data for some prior time bins before each of the one or more target events.

14. The method of claim 11, wherein the network includes any of optical network elements, Time Division Multiplexing (TDM) network elements, Wavelength Division Multiplexing (WDM) network elements, and packet network elements.

15. The method of claim 11, wherein the devices in the network include a plurality of disparate types of devices from a plurality of equipment vendors.

16. The method of claim 11, wherein the associated label is based on one or more of a risk assessment of network equipment, service assurance, and application Quality of Experience (QoE).

17. A non-transitory computer-readable medium comprising instructions for automatically labeling data from a telecommunications network, wherein the instructions, when executed, cause a processor to perform the steps of:
obtaining network data including first data of devices and services in the network, Performance Monitoring (PM) data associated with the devices and services and with associated timestamps, and second data including any of tickets, alarms, and events affecting some of the devices and services and with associated timestamps, wherein the PM data indicates at least one of received optical power, transmitted optical power, forward error correction bit errors, or ethernet errors and code violations;
obtaining one or more target events from the second data based on associated operational impact in the network;
determining the PM data that is statistically correlated with the one or more target events using a machine learning process;
determining the statistically correlated PM data over a corresponding time based on the associated timestamps of the PM data and the one or more target events;
assigning an automatically generated label to the statistically correlated PM data using the machine learning process,
requesting user input related to the statistically correlated PM data via a Graphical User Interface (GUI) for a portion of the statistically correlated PM data adjacent to the assigned automatically generated label for which inference results are ambiguous and the automatically generated label cannot therefore be assigned, and
utilizing a set of labeled data including the assigned automatically generated label and the user input to train the machine learning process.

18. The non-transitory computer-readable medium of claim 17, wherein the instructions, when executed, cause a processor to perform the steps of
subsequent to training a machine learning process with a set of labeled data based on the provided labels, obtaining second PM data based on current operation of the network;
processing the second PM data via the machine learning process; and
obtaining predictions from the machine learning process based on labels associated with the set of labeled data.

19. The non-transitory computer-readable medium of claim 17, wherein the determining statistical correlation includes measuring correlation of the PM data at a same time as each of the one or more target events and measuring the correlation of the PM data for some prior time bins before each of the one or more target events.

20. The non-transitory computer-readable medium of claim 17, wherein the associated label is based on one or more of a risk assessment of network equipment, service assurance, and application Quality of Experience (QoE).

* * * * *